(12) United States Patent
Keyes et al.

(10) Patent No.: US 7,447,652 B2
(45) Date of Patent: Nov. 4, 2008

(54) METHODS AND SYSTEMS FOR PORTFOLIO CASH FLOW VALUATION

(75) Inventors: Tim K. Keyes, West Redding, CT (US); Brian N. Dingman, Gloversville, NY (US)

(73) Assignee: GE Corporate Financial Services, Inc., Norwalk, CT (US)

( * ) Notice: Subject to any disclaimer, the term of this patent is extended or adjusted under 35 U.S.C. 154(b) by 1440 days.

(21) Appl. No.: 09/871,341

(22) Filed: May 31, 2001

(65) Prior Publication Data

US 2003/0033229 A1    Feb. 13, 2003

(51) Int. Cl.
   *G06Q 40/00*    (2006.01)
(52) U.S. Cl. .................. 705/36; 705/37; 705/35
(58) Field of Classification Search ............ 705/36, 705/37, 38, 33, 39, 34, 35
   See application file for complete search history.

(56) References Cited

U.S. PATENT DOCUMENTS

| | | | |
|---|---|---|---|
| 4,953,085 A * | 8/1990 | Atkins | 705/36 R |
| 5,774,881 A | 6/1998 | Friend et al. | |
| 5,875,437 A * | 2/1999 | Atkins | 705/40 |
| 5,940,810 A | 8/1999 | Traub et al. | |
| 6,012,047 A * | 1/2000 | Mazonas et al. | 705/38 |
| 6,055,517 A * | 4/2000 | Friend et al. | 705/36 R |
| 6,058,377 A | 5/2000 | Traub et al. | |
| 6,085,175 A | 7/2000 | Gugel et al. | |
| 6,122,623 A | 9/2000 | Garman | |
| 6,138,102 A | 10/2000 | Hinckley, Jr. | |
| 6,219,650 B1 | 4/2001 | Friend et al. | |
| 6,226,623 B1 | 5/2001 | Schein et al. | |
| 6,654,727 B2 * | 11/2003 | Tilton | 705/36 R |
| 6,985,881 B2 * | 1/2006 | Johnson et al. | 705/36 R |
| 2002/0052766 A1 * | 5/2002 | Dingman et al. | 705/7 |
| 2002/0147666 A1 * | 10/2002 | Baseman et al. | 705/28 |

FOREIGN PATENT DOCUMENTS

| | | |
|---|---|---|
| JP | 2000020603 | 1/2000 |
| JP | 2001051974 | 2/2001 |
| WO | 9854666 | 12/1998 |

OTHER PUBLICATIONS

Micro-loans, peer lending, social support and business development: A case study of a United States-based microenterprise program and its members by Varma, Seema, Ph.D., The University of North Carolina at Chapel Hill, 2001, 157 pages; AAT 3007904.*

* cited by examiner

*Primary Examiner*—Frantzy Poinvil
*Assistant Examiner*—Clement Graham
(74) *Attorney, Agent, or Firm*—Armstrong Teasdale LLP

(57) ABSTRACT

In an exemplary embodiment, invention is a method for analyzing portfolios of distressed financial assets for the purpose of bidding to acquire those assets. The method utilizes a network-based system including a server system coupled to a centralized database and at least one client system. The method comprises of various steps from generating cash flow data table from variety of data sources to performing sensitivity analysis using Monte Carlo Simulation Model to provide different scenarios. The method utilizes a variety of assumptions in performing analysis, and exports cash flow projections into a pre-determined format to develop financially attractive bids, which have strong probability of, expected return on investment after taking into account a variety of foreseeable risks.

36 Claims, 26 Drawing Sheets

Step 2 - Import data to Cash Flow Model

File Edit View Insert Format Tools Data Window Help

Arial ▼ 10 ▼ B I U ≡ ≡ ≡ ≡ $ % ,

A20

| | A | B | C | D | E |
|---|---|---|---|---|---|
| 1 | GE Capital Commercial Finance | | | Expected ED | |
| 2 | *Special Opportunities Cash Flow Model* | | | | |
| 3 | 4/23/01 | | | | |
| 20 | | | | TOTALS | Month |
| | | | | | 1 |
| 21 | *Legal / Lic. / Expenses* | | | | |
| 22 | DPO expenses | | | 24,427 | 2,595 |
| 23 | Restructure Expenses | | | - | - |
| 24 | Litigated Resolution Expenses | | | 45 | - |
| 25 | Litigated Sell | | | 6,645 | - |
| 26 | Deed-in-Lieu | | | 6,588 | - |
| 27 | Inferred | | | 47,636 | 7,237 |
| 28 | Loans with Issues | | | | |
| 29 | Grey-White | | | - | - |
| 30 | Grey-Black | | | - | - |
| 31 | Black | | | - | - |
| 32 | Total of loads with Issues | | | - | - |
| 33 | Compliance Processing Expenses | | | 17,786 | 1,832 |
| 34 | Setup Cost | | | 19,966 | 2,218 |
| 35 | Due Diligence Cost | | | - | - |
| 36 | AIM Expenses | | 1.00 | 04,100 | 2,791 |
| 37 | AIM YAT | | 1 | 12,825 | 419 |
| 38 | TOTAL EXPENSES | | 23,122 | 219,887 | 17,092 |
| 39 | | Total Expenses USD: | | 1,444,755 | 78,336 |
| 40 | Total Cash Flow: | | | 21,047 | |
| 41 | Escrow Account | | | | |
| 42 | NPV | | | 384,052 | 76,401,172 |
| 43 | NPV or % of UPB (for Non-Z-bids) | | | 15.56% | |
| 44 | UPB for Loans Valued at Zero (Black and Other) | | | 662,843 | |

232 — Load Cash Flow Model  234 — Move Data

| F | G | H | I | J | K | L |
|---|---|---|---|---|---|---|
| 2 | 3 | 4 | 5 | 6 | 7 | |
| - | 1,632 | - | - | 1,736 | - | - |
| - | - | - | - | - | - | - |
| - | 93 | - | - | 86 | - | - |
| - | - | - | - | 135 | - | - |
| 54 | 417 | 417 | 417 | 1,113 | 680 | 63 |
| - | - | - | - | - | - | - |
| - | - | - | - | - | - | - |
| - | - | - | - | - | - | - |
| - | 11,520 | - | - | 2,034 | - | - |
| 2,218 | 2,218 | 2,218 | 2,218 | 2,218 | 2,218 | 2,218 |
| 2,791 | 2,380 | 2,380 | 2,380 | 1,793 | 1,753 | 1,793 |
| 419 | 357 | 357 | 357 | 253 | 263 | 263 |
| 5,432 | 18,617 | 5,372 | 5,372 | 9,379 | 4,915 | 4,915 |
| -2,321 | 51,291 | 4,964 | 4,964 | 56,238 | 12,928 | 12,928 |
| (2,683,288) | 47,583,454 | 4,491,021 | 44,380,099 | 48,376,572 | 10,851,527 | 10,583,518 |

Step 3 & 4 - Move and calculate to expected Cash Flows and expenses by likely disposition Type

| BorrowerID | LoadID | strategyNum | strategyDescription | ERper | cash | perOfERpay1 | perOfERtiming1 |
|---|---|---|---|---|---|---|---|
| 3366 | 99003000298023 | 26 | Loan Deed-in-Lieu | 0.095999998 | | 1 | 12-15 months |
| 3366 | 99003000298023 | 26 | Loan Deed-in-Lieu | 0.095999998 | | 1 | 12-15 months |
| 3366 | 99003000298030 | 26 | Loan Deed-in-Lieu | 0.095999998 | | 1 | 12-15 months |
| 3366 | 99003000298022 | 26 | Loan Deed-in-Lieu | 0.095999998 | | 1 | 12-15 months |
| 3366 | 99003000298024 | 26 | Loan Deed-in-Lieu | 0.095999998 | | 1 | 12-15 months |
| 3366 | 99003000298025 | 26 | Loan Deed-in-Lieu | 0.095999998 | | 1 | 12-15 months |
| 3366 | 99003000298026 | 26 | Loan Deed-in-Lieu | 0.095999998 | | 1 | 12-15 months |
| 3366 | 99003000298027 | 26 | Loan Deed-in-Lieu | 0.095999998 | | 1 | 12-15 months |
| 3366 | 99003000298029 | 26 | Loan Deed-in-Lieu | 0.095999998 | | 1 | 12-15 months |
| 3366 | 99003000000033 | 26 | Loan Deed-in-Lieu | 0.095999998 | | 1 | 12-15 months |
| 3366 | 99003000298031 | 26 | Loan Deed-in-Lieu | 0.095999998 | | 1 | 12-15 months |
| 3366 | 99003000298021 | 26 | Loan Deed-in-Lieu | 0.095999998 | | 1 | 12-15 months |
| 6046 | 99003000000336 | 27 | Inferred | 0.214568732 | | 1 | |
| 6570 | 99003000000495 | 27 | Inferred | 0.259266258 | | 1 | |
| 6884 | 99003002298222 | 21 | Easy Loan DPO | 0.100000001 | | 1 | 18-24 months |
| 6884 | 99003002298220 | 21 | Easy Loan DPO | 0.100000001 | | 1 | 18-24 months |
| 6884 | 99003002298218 | 21 | Easy Loan DPO | 0.100000001 | | 1 | 18-24 months |
| 6884 | 99003000000442 | 21 | Easy Loan DPO | 0.100000001 | | 1 | 18-24 months |
| 6884 | 99003002298221 | 21 | Easy Loan DPO | 0.100000001 | | 1 | 18-24 months |
| 6884 | 99003002298223 | 21 | Easy Loan DPO | 0.100000001 | | 1 | 18-24 months |
| 6884 | 99003007799001 | 21 | Easy Loan DPO | 0.100000001 | | 1 | 18-24 months |
| 6884 | 99003002298219 | 21 | Easy Loan DPO | 0.100000001 | | 1 | 18-24 months |

Assumption sheet

GE CAPITAL FINANCE

| Rates | Method: Geometric |
|---|---|
| Assumed Finance Rate (Annual) | 24.0% |
| Assumed Finance Rate (Monthly) | 1.8% |
| Residual Sale Factor | 90.0% |
| Portfolio Discount Rate | 35.0% |
| Calculated discount rate (Per Period) | 2.5% |

Assumptions

| Disposition Discount rates | Annual |  |
|---|---|---|
| DPO | 35.00% | 2.5% |
| Restructure | 35.00% | 2.5% |
| Litigation w/ Res. | 35.00% | 2.5% |
| Litigated Sell / Deed In Lie | 35.00% | 2.5% |
| Inferred | 35.00% | 2.5% |
| Grey-White | 35.00% | 2.5% |
| Grey-Black | 35.00% | 2.5% |
| Black | 35.00% | 2.5% |

| Asset Management Expenses (% of UPB) | YR. 1 | YR. 2 | YR. 3 | YR. 4 |
|---|---|---|---|---|
| Monthly A/M Expenses BY YEAR | 0.17% | 2.30% | 3.14% | 5.24% |
| FALL OFF RATE Used | 27.87% | 100.00% | 47.83% | 100.00% |
| Total w/VAT | 2,792,049 | 3,184,546 | 2,450,886 | ######## |
| Model | 2,792,033 | 3,184,478 | 2,450,882 | ######## |

| | 4 Year Total (MXP) | Model | Objective Function |
|---|---|---|---|
| | 96,780,260 | 86,794,186 | 2,414,609 |
| | 96,794,186 | | |

| Value-Added Tax Rate | | |
|---|---|---|
| VAT | | 15.00% |

| Setup, Conversion and Loan Registration Costs | | Over # of M | Monthly |
|---|---|---|---|
| MEX$ | 2,099,515 | 9 | 2,218,488 |
| Exchange at | ######## | 9.51 | |

| Due Diligence Costs | | Over # of M | Monthly |
|---|---|---|---|
| MEX$ | $0 | $0 | 1.00 |
| Exchange at | | 9.51 | |

| Compliance / Delays by UPB Bin (months) | Total | Compliance | Closing |
|---|---|---|---|
| A | 0 | 0 | 0 |
| B | 0 | 0 | 0 |
| C | 0 | 0 | 0 |
| D | 0 | 0 | 0 |
| E | 0 | 0 | 0 |
| F | 0 | 0 | 0 |

| Compliance Cost per Borrower Group (ER > 250K) at Min T1 | | |
|---|---|---|
| 1,800.00 | USD | 1.00 |
| 17,118.00 | MXP | |

Closing Costs Table Lit. Forcl. And Deed-In-Lieu

| | RE Secured Loan | | Non RE Secured Loan | | |
|---|---|---|---|---|---|
| UPB (000s MXP) | DPO/Restruct | Foreclose | DPO/Restruct | Foreclose | New Litigation Factor |
| 0 | 15.00% | 8.25% | 18.75% | 9.38% | 10.00% |
| 50 | 13.00% | 6.75% | 15.00% | 7.50% | |
| 100 | 9.00% | 4.50% | 10.50% | 6.75% | |
| 300 | 7.50% | 3.75% | 9.00% | 4.50% | |
| 500 | 6.00% | 3.00% | 7.50% | 3.75% | |
| 1,500 | 4.95% | 2.25% | 6.00% | 3.00% | |
| 3,000 | 3.00% | 0.75% | 4.50% | 2.25% | |
| 5,000 | 2.63% | 1.46% | 3.00% | 1.50% | |

| Closing Costs Table Lit. Forcl. And Deed-In-Lieu | VAT ADDED | % to Apply to New Deed & Forecloser | Applied % OR Amount | |
|---|---|---|---|---|
| Pub Meters | 1.00% | 0.0115 | 0 | 0.00% |
| Pub Registry | 0.30% | 0.00345 | 0 | 0.00% |
| State Ag Tax | 3.00% | 0.0345 | 0 | 0.00% |
| Appraisal Fee | 0.20% | 0.0023 | 0 | 0.00% |
| Brokerage | 7.00% | 0.0805 | 0 | 0.00% |
| Lien Search | 450 | 517.5 | 0 | |
| Auction Publishing at Foreclosure | 5,000 | 5750 | 0 | |
| New Litigation Setup | 3,000 num months applies 6 | | | |
| Servicing and Closing Costs | 20.00% | 1.00 | 23.00% | Legal Buy-Out | 0.00% |

| DB NAME (with an 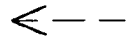 | Cash flow |
|---|---|

RESULTS

| Total Cash Flows | 1,444,755 |
|---|---|
| PV of Cash Flows | 984,052 |
| Bid Price | 14.04% |

Sensitivity Assumptions

| Asset Mgt | U(-.1,.1) |
|---|---|
| Net A/M Expenses | N(-15%,+15%) |
| A/M Expense Rate | N(0.60%,0.90%) |
| Residual Value ER | N(-20%,+20%) |
| Brokerage | U(3.6%,4.4%) |

| Escrow Account at Month 1 | 126,284,197 | | |
|---|---|---|---|
| LTM Total | | | 21,047,366 |

| ER % Adjust for Uniform CB assumptions | Low | High | Amount Used |
|---|---|---|---|
| DPO | 0.95 | 1.05 | |
| Restruct | 0.95 | 1.05 | |
| Litigation | 0.95 | 1.05 | |
| Litigated | 0.95 | 1.05 | |
| Deed-In-L | 0.95 | 1.05 | |
| Inferred | 0.95 | 1.05 | |
| Grey-Wh | 0.95 | 1.05 | |
| Grey-Bla | 0.95 | 1.05 | |
| Black | 0.95 | 1.05 | |

Step 4 - Roll up disposition cash flow into portfolio cash flow

GE Capital Commercial Finance
*Special Opportunities Cash Flow Model*
4/23/01

— 282

| CASH FLOWS | | # of Loans | Expected ER TOTALS | Month 1 | 2 |
|---|---|---|---|---|---|
| DPO | 1 | 2,024 | 798,480 | 71,710 | |
| Restructure | 1 | - | 2,084 | | |
| Litigation w / Res | 1 | 10 | 31,399 | | |
| Litigation w / Sale | 1 | 26 | 31,060 | | |
| Deed-In-Lieu | 1 | 30 | | | |
| Inferred | 1 | 8,032 | 780,571 | 2,671 | 2,671 |
| Loans with Issues | 1 | | | | |
| Grey-White | 1 | | | | |
| Grey-Black | 1 | | | | |
| Black | 1 | | | | |
| Total of Loans with Issues | | 10,122 | | | |
| Total Revenue | | | 1,643,594 | 74,381 | 2,671 |
| Interest Payment | | | | | |
| Potential residual value | | | | | |
| TOTAL CASH FLOWS | | | 1,643,594 | 74,381 | 2,671 |
| *Legal / Lit. / Expenses* | | | | | |
| DPO expenses | | | 24,427 | 2,595 | |
| Restructure Expenses | | | 45 | | |
| Litigated Resolution Expenses | | | 6,645 | | |
| Litigated Sell | | | 6,588 | | |
| Deed-In-Lieu | | | | | |
| Inferred | | | 47,636 | 7,237 | 64 |
| Loans with Issues | | | | | |
| Grey-White | | | | | |
| Grey-Black | | | | | |
| Black | | | | | |

| | | | | |
|---|---|---|---|---|
| Total Loads with Issues | | 17,786 | 1,832 | |
| Compliance Processing Expenses | | | | |
| Setup Cost | | 19,966 | 2,218 | 2,218 |
| Due Diligence | | | | |
| AIM Expenses | | 84,169 | 2,791 | 2,791 |
| AIM VAT | | 12,625 | 419 | 419 |
| TOTAL EXPENSES | | 219,887 | 17,092 | 5,492 |
| Total Expenses USD | 1.00 | 1,444,755 | 78,336 | -2,821 |
| Total Cash Flows | 23,122 | 21,047 | | |
| Escrow Account | | | | |
| NPV | | 984,052 | 76,401,172 | (2,683,248) |
| NPV as % of UPB (for Non-Z-bids) | | 15.56% | | |
| UPB for Loans Valued at Zero (Black and Other) | | 662,843 | | |
| Bid Price | Total Outstanding UPB | 6,988,234 | 6,325,391 | 5,782,571 | 5,782,571 |
| 14.04% | NPV as % of Total UPB | 14.08% | 15.56% | 100.00% | 100.00% |
| IRR | High Value UPB | | | | |
| 62.15% | Total Principal Payments | | 1,643,594 | 74,381 | 2,671 |
| | Wtd Avg Life & Profile | | 18 | 4.5% | 4.7% |
| | CashFlows | | (888,084,939) | 74,380,945 | 2,671,291 |
| | Cume Cash Flows | | | (813,703,994) | (811,032,708) |

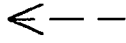

302 | Assumptions | CashFlow | Profile | IRR | DPO | Infer | Compliance | Restruct | LitigateWRes
      286              288   290   294    292      296

| | | | | | |
|---|---|---|---|---|---|
| 11,520 | | | | | |
| 2,218 | 2,218 | 2,218 | 2,218 | 2,218 | |
| | | | 2,054 | | |
| 2,380 | 2,380 | 2,380 | 2,218 | 2,218 | |
| 357 | 357 | 357 | 1,753 | 1,753 | |
| | | | 263 | 263 | |
| 18,617 | 5,372 | 5,372 | 3,379 | 4,315 | 4,315 |
| 51,291 | 4,964 | 4,964 | 56,208 | 12,928 | 12,928 |
| 47,583,454 | 4,491,021 | 44,280,099 | 48,376,572 | 10,851,527 | 10,583,510 |
| 1,929,450 | 4,929,450 | 4,929,450 | 3,632,179 | 3,632,179 | 3,632,179 |
| 85.25% | 85.25% | 85.25% | 62.81% | 62.81% | 62.81% |
| 69,907 | 10,335 | 10,335 | 65,587 | 17,843 | 17,843 |
| 8.9% | 3.6% | 10.2% | 14.2% | 15.3% | 16.4% |
| 63,907,467 | 10,335,104 | 10,335,104 | 65,587,444 | 17,842,937 | 17,842,937 |
| (741,125,236) | (730,730,131) | (720,867,027) | (654,867,584) | (637,024,646) | (619,181,703) |

LitigateForeclose 298   DeedInLieu 300

| | 3 | 4 | 5 | 6 | 7 | 8 |
|---|---|---|---|---|---|---|
| | 45,572 | | | 47,442 | | |
| | | | | | | |
| | 18,395 | 18,335 | 18,335 | 582 | | |
| | | | | 17,343 | 17,343 | 17,343 |
| | | | | | | |
| | 63,967 | 18,335 | 18,335 | 17,343 | 17,343 | 17,343 |
| | 63,967 | | | 65,367 | | |
| | | | | 65,367 | | 17,343 |
| | 1,632 | | | 1,706 | | |
| | 33 | | | 46 | | |
| | 417 | 417 | 417 | 195 | | |
| | | | | 1,143 | | |
| | | | | | 680 | 680 |

Step 5 - Simulation of cash flow Model

GE Capital Commercial Finance
*Special Opportunities Cash Flow Model*
4/23/01

| CASH FLOWS | | # of Loans | Expected ER TOTALS |
|---|---|---|---|
| CPO | 0.97 | 802 | 383,505 |
| Restructure | 0.98 | - | - |
| Litigation w / Res | 0.97 | 9 | 1,917 |
| Litigation w / Sale | 1.01 | 14 | 27,962 |
| Deed-in-Lieu | 1 | 24 | 18,279 |
| Inferred | 1.1 | 2,405 | 166,965 |
| Loans with Issues | | | - |
| Grey-White | 0.86 | | - |
| Grey-Black | 0.76 | | - |
| Black | 1 | | - |
| Total of Loans with Issues | | 8,262 | - |
| Total Revenue | | | 598,448 |
| Interest Payment | | | - |
| Potential residual value | | | - |
| TOTAL CASH FLOWS | | | 598,448 |
| *Expenses* | | | |
| DPO expenses | | | 13,608 |
| Restructure Expenses | | | - |
| Litigated Resolution Expenses | | | 4 |
| Litigated Sell | | | 2,970 |
| Deed-in-Lieu | | | 3,427 |
| Inferred | | | 7,768 |
| Loans with Issues | | | - |
| Grey-White | | | - |
| Grey-Black | | | - |
| Black | | | - |

322 { (CASH FLOWS bracket)
324 { (Expenses bracket)
326 (Total of Loans with Issues)

METHODS AND SYSTEMS FOR PORTFOLIO CASH FLOW VALUATION

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

This invention relates generally to valuation methods for financial instruments and more particularly to analyzing portfolios of distressed financial assets for the purpose of bidding to acquire those assets.

A large number of assets such as loans, e.g., ten thousand loans or other financial instruments, sometimes become available for sale due to economic conditions, the planned or unplanned divestiture of assets or as the result of legal remedies. These assets are often referred to as distressed financial assets. The sale of thousands of commercial loans or other financial instruments sometimes involving the equivalent of billions of dollars in assets must sometimes occur within a few months. Of course, the seller of assets wants to optimize the value of the portfolio, and will sometimes group the assets in "tranches." The term "tranche" as used herein is not limited to foreign notes but also includes assets and financial instrument groupings regardless of country or jurisdiction.

Bidders may submit bids on all tranches, or on only some tranches. In order to win a tranche bid, a bidder typically must submit the highest bid for that tranche. In connection with determining a bid amount to submit on a particular tranche, a bidder often will perform due diligence, such as engaging underwriters to evaluate as many loans as possible within a tranche and within the available limited time. When the time for submitting a bid is about to expire, the bidder will evaluate the loans underwritten at that time, and then attempt to extrapolate a value to the loans that have not yet been analyzed by the underwriters.

As a result of this process, a bidder may significantly undervalue a tranche and submit a bid that is not competitive or bid higher than the underwritten value and assume unquantified risk. Since the objective is to win each tranche at a price that enables a bidder to earn a return, losing a tranche due to significant undervaluation of the tranche represents a lost opportunity.

Currently, business enterprises assess an acquisition or sale of assets and portfolios of assets on rapid schedules and often at great distances and varying time zones from the general management teams and functional heads which typically approve the offers for purchase or sale of these assets. Employees, partners and collaborators associated with due diligence regarding the purchase of the assets are typically brought together for a relatively short duration of time to accomplish the due diligence. Typically due diligence activities are conducted in physical proximity to the sources of information associated with the assets. The collaborating personnel often do not have the benefit of training or knowledge of the complete set of analytical tools at their disposal nor do they have "best practices" from previous efforts of a similar nature.

Consolidation of employees and collaborators into a remote physical location for the duration of the due diligence effort is time consuming and expensive. In addition, persons on due diligence teams search for data and processes in an ad hock fashion, typically relying on a small subset of other personnel who have detailed information about information sources, underwriting, analytical tools, reports, and completed analysis. The subset of individuals who have the information become bottlenecks within a due diligence time line, driving up due diligence costs and adding time that could have otherwise been invested in more value added due diligence.

In summary, there are several factors that typically prevent a substantive analysis on portfolios of distressed financial assets. Some of these factors include incomplete information, limited time to bid date, alternative possible dispositions or resolutions of each asset, expense associated with gathering information, issues related to underwriting and legal, variation of expected assets resolution tinting, uncertain future expenses related to collection on assets, large number of assets in a portfolio and model development for financial analysis.

BRIEF SUMMARY OF THE INVENTION

In one aspect, an integrated Internet based system for managing portfolio cash valuation is provided. The system includes at least one computer, and at least one server. The computer is connected to server via a network and is configured to store accumulated assumptions and knowledge in a repository from a prior portfolio cash evaluation, apply consolidated analytical tools to evaluate the portfolio of assets, and generate management reports that analyze the portfolio. In an exemplary embodiment, the system includes a database, which may be utilized to store assumptions and retrieve as necessary. The server is further configured with consolidated analytical tools including at least one of a Cash Flow Model, a Monte Carlo Simulation Model and a Financial Analysis Model. In an exemplary embodiment, these models reside on a client system operationally. In another exemplary embodiment, the Cash Flow Model, the Monte Carlo Simulation Model and the Financial Analysis Model can reside on the server for distribution to client systems. The Financial Model is capable of exporting data from the cash flow model in a predefined format for use in a financial model. The server is further configured with a suite of at least one of business processes, computer systems, analytical tools, data manipulation tools, business process tools, methodologies and analytics. In an exemplary embodiment, the server is further configured with a database that accumulates and organizes data relating to at least one Bank Records, Credit Agencies, Government Agencies, Legal Documents and Contracts, and Underwriting Reports.

In another aspect, a method for analyzing portfolios of distressed financial assets for the purpose of bidding to acquire those assets is provided. The method utilizes a network-based system including a server system coupled to a centralized database and at least one client system. The method comprises the steps of generating a cash flow data table from various data sources, importing cash flow data from the data table into a cash flow model, automatically segmenting cash flow data by potential asset disposition types utilizing the cash flow model, applying disposition specific cash flow and expense timings based on cash flow model assumptions and rolling up discounted projections into total deal level cash flow projections, performing a sensitivity analysis using a Monte Carlo Simulation Model to provide different scenarios based on a variety of assumptions retrieved from the database, and exporting cash flow projections into a pre-determined format to develop financially attractive bids, which have strong probability of expected return on investment after taking into account a variety of foreseeable risks.

In yet another aspect, a computer program embodied on a computer readable medium is provided. The computer program includes a code segment that sets up a directory structure to organize information into a centralized database and provides users access to a specific set of data stored in the centralized database to facilitate decision making in response to an inquiry. Additionally, the computer program includes a code segment that downloads valuation assessment from the database, develops monthly income projections from individual loan valuations, develops monthly expense projections from pre-determined asset management scenarios, aggregates loan cash flows into portfolio cash flows, adjusts portfolio cash flow expenses against pre-determined asset management targets, calculates financial ratios for asset management planning, simulates various scenarios based on pre-defined assumptions, and calculates confidence assessment for portfolio investment.

In yet a further aspect, a centralized database is provided which includes data corresponding to at least one of Cash Flow Data, Assumptions Data, Potential Asset Disposition Type Data, Standardized Data, and Worksheets & Code Modules Data, data corresponding to financial models and business process tools, data corresponding to best practices, and data corresponding valuation process and underwriting. In yet another aspect, a method for analyzing a deal utilizing a borrower level pricing process is disclosed. The method includes calculating a borrower-specific price for each borrower in the portfolio, determining influence of each borrower on a given portfolio utilizing influence metrics, and selecting a group of borrowers based on borrowers individual ranking for further review.

BRIEF DESCRIPTION OF THE DRAWINGS

FIG. 10 is an exemplary embodiment of a spreadsheet depicting the raw data, which were inputted into the database;

FIG. 11 is an exemplary embodiment of an Assumption Sheet also referred to as Assumption Data Sheet or Assumption Worksheet;

DETAILED DESCRIPTION OF THE INVENTION

Exemplary embodiments of systems and processes that facilitate integrated network-based electronic reporting and workflow process management related to a Portfolio Cash Valuation System (PCVS) are described below in detail. The systems and processes facilitate, for example, electronic submission of information using a client system, automated extraction of information, and web-based assessment reporting and management.

The systems and processes are not limited to the specific embodiments described herein. In addition, components of each system and each process can be practiced independent and separate from other components and processes described herein. Each component and process also can be used in combination with other components and processes.

In an exemplary embodiment, the application is implemented as a Centralized Database utilizing a Structured Query Language (SQL) with a client user interface front-end for administration and a web interface for standard user input and reports. The application is web enabled and runs on a business entity's intranet. In a further exemplary embodiment, the application is fully accessed by individuals having authorized access outside the firewall of the business entity through the Internet. In another exemplary embodiment, the application is run in a Windows NT environment or simply on a stand alone computer system. In yet another exemplary embodiment, the application is practiced by simply utilizing spreadsheet software or even through manual process steps. The application is flexible and designed to run in various different environments without compromising any major functionality.

Figure 1:
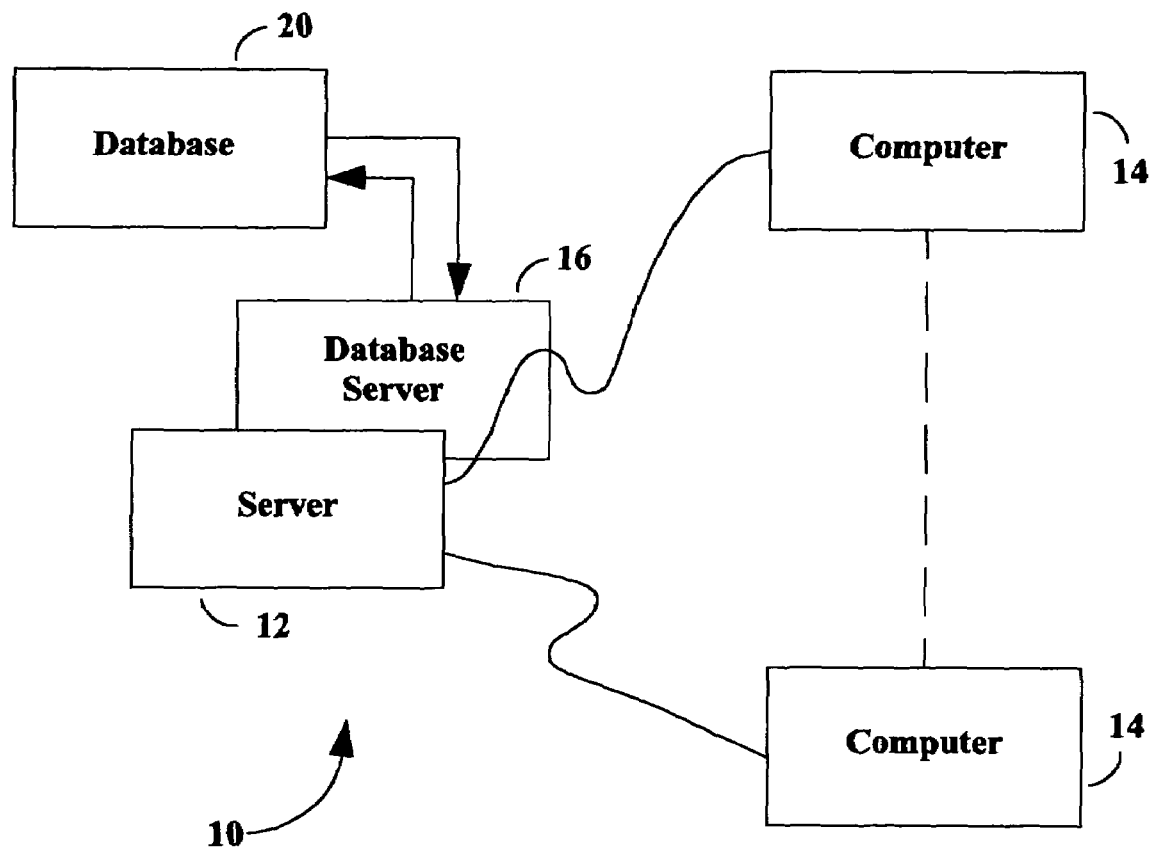
FIG. 1 is a block diagram of a Portfolio Cash Valuation System (PCVS) that includes a server sub-system and a plurality of customer devices connected to the server system.

FIG. 1 is a block diagram of PCVS 10 that includes a server sub-system 12, sometimes referred to herein as server 12 or server system 12, and a plurality of customer devices 14 connected to server 12. PCVS 10 can be applied to distressed asset portfolio analysis. Computerized modeling and grouping tools, as described below in more detail, are stored in server 12 and can be accessed by a requester at any one of computers 14. In one embodiment, devices 14 are computers including a web browser, and server 12 is accessible to devices 14 via a network such as an intranet or a wide area network such as the Internet. In an alternative embodiment, devices 14 are servers for a network of customer devices. Customer device 14 could also be any client system capable of interconnecting to the Internet including a web based digital assistant, a web-based phone or other web-based connectable equipment. In another embodiment, server 12 is configured to accept information over a telephone, for example, at least one of a voice responsive system where a user enters spoken data, or by a menu system where a user enters a data request using the touch keys of a telephone as prompted by server 12.

Devices 14 are interconnected to the network, such as a local area network (LAN) or a wide area network (WAN), through many interfaces including dial-in-connections, cable modems and high-speed lines. Alternatively, devices 14 are any device capable of interconnecting to a network including a web-based phone or other web-based connectable equipment. Server 12 includes a database server 16 connected to a centralized database 20. In one embodiment, centralized database 20 is stored on database server 16 and is accessed by potential customers at one of customer devices 14 by logging onto server sub-system 12 through one of customer devices 14. In an alternative embodiment, centralized database 20 is stored remotely from server 12.

In one exemplary embodiment, PCVS 10 is configured to store accumulated assumptions and knowledge in a repository from a prior portfolio cash evaluation, apply consolidated analytical tools to evaluate the portfolio of assets, and generate management reports that analyze the portfolio. In an exemplary embodiment, system 10 utilizes database 20 to store assumptions and retrieve as necessary. Server 12 is further configured with consolidated analytical tools including at least one of a Cash Flow Model, a Monte Carlo Simulation Model and a Financial Analysis Model. In an exemplary embodiment, these models reside on a customer devices 14 operationally. In another exemplary embodiment, the Cash Flow Model, the Monte Carlo Simulation Model and the Financial Analysis Model can reside on server 12 for distribution to customer devices 14. The Financial Model is capable of exporting data from the cash flow model in a predefined format for use in a financial model. Server 12 is further configured with a suite of at least one of business processes, computer systems, analytical tools, data manipulation tools, business process tools, methodologies and analytics. In an exemplary embodiment, server 12 is further configured with a database that accumulates and organizes data relating to at least one Bank Records, Credit Agencies, Government Agencies, Legal Documents and Contracts, and Underwriting Reports.

In yet another exemplary embodiment, server 12 is configured to execute a computer program embodied on a computer readable medium. Customer device 14 accesses the computer program that has been stored on server 12 to analyze portfolios using portfolio cash valuation analysis. The computer program includes a code segment that sets up a directory structure to organize information into a centralized database and provides users access to a specific set of data stored in the centralized database to facilitate decision making in response to an inquiry. Additionally, the computer program includes a code segment that downloads valuation assessment from the database, develops monthly income projections from individual loan valuations, develops monthly expense projections from pre-determined asset management scenarios, aggregates loan cash flows into portfolio cash flows, adjusts portfolio cash flow expenses against pre-determined asset management targets, calculates financial ratios for asset management planning, simulates various scenarios based on pre-defined assumptions, and calculates confidence assessment for portfolio investment.

Figure 2:
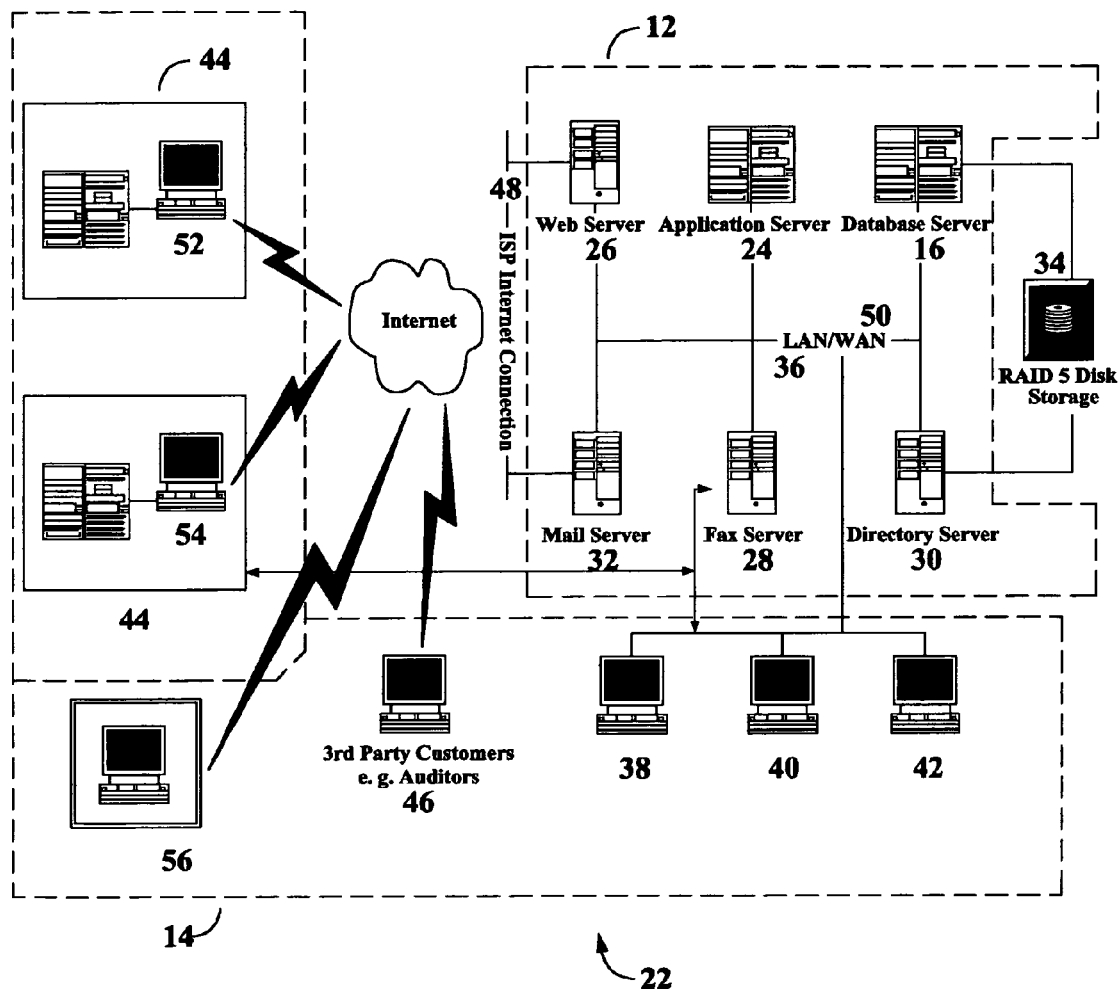
FIG. 2 is an expanded version block diagram of an exemplary embodiment of a server architecture of the PCVS.

FIG. 2 is an expanded version block diagram of an exemplary embodiment of a server architecture of a PCVS 22. PCVS 22 is implemented for the complex environment. Components in PCVS 22, identical to components of system 10 (shown in FIG. 1), are identified in FIG. 2 using the same reference numerals used in FIG. 1. PCVS 22 includes server sub-system 12 and customer devices 14. Server sub-system 12 includes database server 16, an application server 24, a web server 26, a fax server 28, a directory server 30, and a mail server 32. A disk storage unit 34 is coupled to database server 16 and directory server 30. Servers 16, 24, 26, 28, 30, and 32 are coupled in a local area network (LAN) 36. In addition, a system administrator workstation 38, a workstation 40, and a supervisor workstation 42 are coupled to LAN 36. Alternatively, workstations 38, 40, and 42 are coupled to LAN 36 via an Internet link or are connected through an intranet.

Each workstation 38, 40, and 42 is a personal computer including a web browser. Although the functions performed at the workstations typically are illustrated as being performed at respective workstations 38, 40, and 42, such functions can be performed at one of many personal computers coupled to LAN 36. Workstations 38, 40, and 42 are illustrated as being associated with separate functions only to facilitate an understanding of the different types of functions that can be performed by individuals having access to LAN 36.

Server sub-system 12 is configured to be communicatively coupled to various individuals or employees 44 and to third parties, e.g., a customer 46 via an ISP Internet connection 48. The communication in the exemplary embodiment is illustrated as being performed via the Internet, however, any other wide area network (WAN) type communication can be utilized in other embodiments, i.e., the systems and processes are not limited to being practiced via the Internet. In addition, and rather than a WAN 50, local area network 36 could be used in place of WAN 50.

In the exemplary embodiment, any employee 44 or customer 46 having a workstation 52 can access server sub-system 12. One of customer devices 14 includes a workstation 54 located at a remote location. Workstations 52 and 54 are personal computers including a web browser. Also, workstations 52 and 54 are configured to communicate with server sub-system 12. Furthermore, fax server 28 communicates with employees 44 and customers 46 located outside the business entity and any of the remotely located customer systems, including a customer system 56 via a telephone link. Fax server 28 is configured to communicate with other workstations 38, 40, and 42 as well.

The systems described in FIGS. 1 and 2 are configured to implement a methodology to analyze distressed portfolios, based upon actual historical cost data, predicted operations and cost data and actual cost data, where applicable. By determining a likely expenses stream, a net present value can be placed on the portfolios and its underlying assets and establish target bids that will result into profitability, if accepted.

Figure 3:
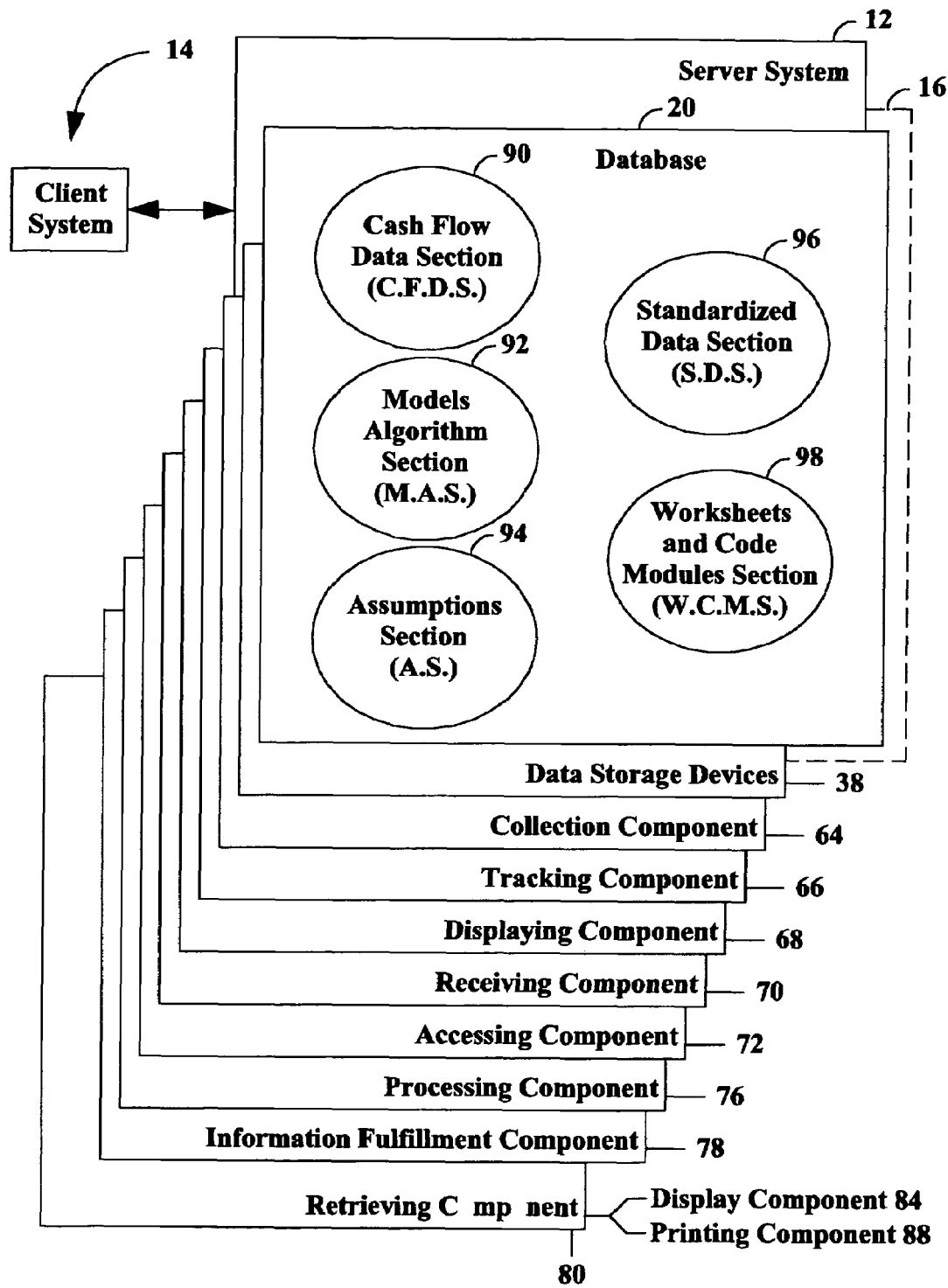
FIG. 3 shows a configuration of a database within a database server of the server system shown in FIG. 1.

FIG. 3 shows a configuration of database 20 within database server 16 of server system 12 shown in FIG. 1. Database 20 is coupled to several separate components within server system 12. These separate components perform specific tasks as required to achieve the system functionality.

Server system 12 includes a collection component 64 for collecting information from users into centralized database 20, a tracking component 66 for tracking information, a displaying component 68 to display information, a receiving component 70 to receive a specific query from client system 14, and an accessing component 72 to access centralized database 20. Receiving component 70 is programmed for receiving a specific query from one of a plurality of users. Server system 12 further includes a processing component 76 for searching and processing received queries against data storage device 34 containing a variety of information collected by collection component 64. An information fulfillment component 78, located in server system 12, downloads the requested information to the plurality of users in the order in which the requests were received by receiving component 70. Information fulfillment component 78 downloads the information after the information is retrieved from data storage device 34 by a retrieving component 80. Retrieving component 80 retrieves, downloads and sends information to client system 14 based on a query received from client system 14 regarding various alternatives.

Retrieving component 80 further includes a display component 84 configured to download information to be displayed on a client system's graphical user interface and a printing component 88 configured to print information. Retrieving component 80 generates various reports requested by the user through client system 14 in a pre-determined format. System 10 is flexible to provide alternative reports and is not constrained to the options set forth above.

In an exemplary embodiment, database 20 is divided into a Cash Flow Data Section (CFDS) 90, Models Algorithm Section (MAS) 92, Assumptions Section (AS) 94, Standardized Data section (SDS) 96, and Worksheets & Code Modules Section (WCMS) 98. Sections 90, 92, 94, 96 and 98 within database 20 are interconnected to update and retrieve the information as required. Each Section is further divided into several individualized sub-sections to store data in various different categories. In yet another exemplary embodiment, customized sections are developed using key evaluation metrics.

The architecture of system 10 as well as various components of system 10 are exemplary only. Other architectures are possible and can be utilized in connection with practicing the processes described below.

Figure 4:
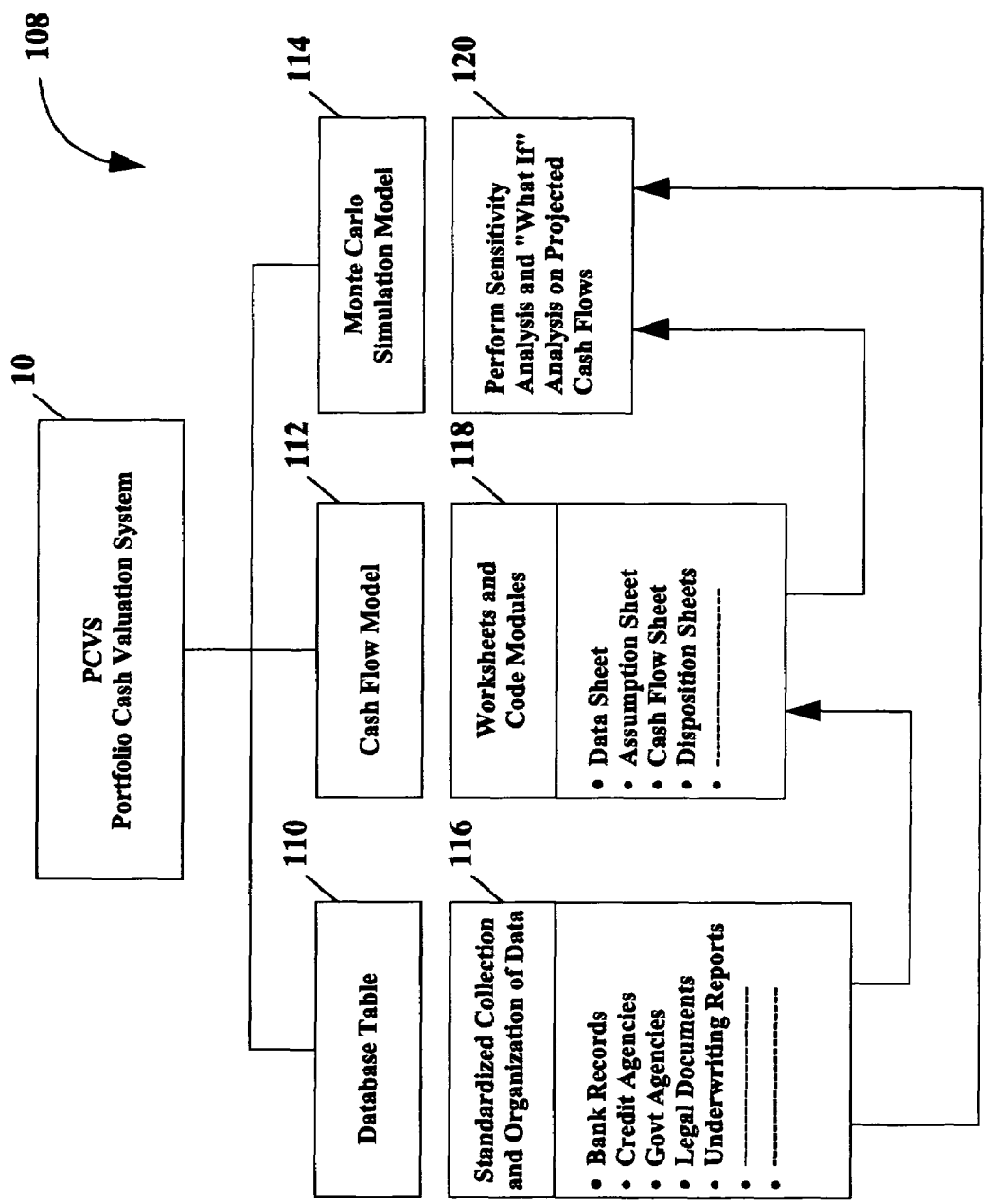
FIG. 4 is an exemplary embodiment of a logical structure of the PCVS (shown in FIGS. 1 and 2)

FIG. 4 is an exemplary embodiment of a logical structure 108 of PCVS 10 (shown in FIG. 1) and PCVS 22 (shown in FIG. 2). The PCVS integrates a Structured Database Table 110, a Cash Flow Model 112, and a Monte Carlo Simulation Model 114 to perform the portfolio analysis and provide recommendations to management based on results obtained from the analysis. Database table 110 resides in a relational database designed to standardize the collection and organization of many disparate data sources 116 typically required to properly analyze a large portfolio of assets; (bank records, credit agencies, government agencies, legal documents, underwriting reports, etc.). As part of the data analysis process, database table 110 of projected potential recoveries is populated. In an exemplary embodiment, database table 110 is queried from the EXCEL application to import data records into cash flow model 112.

Cash flow model 112, also referred to as a Portfolio Cash Valuation Model, includes several worksheets and a series of code modules 118. The code modules control querying the database and processing the retrieved data records.

In an exemplary embodiment, code modules are developed using Visual Basic. Visual Basic is a programming language and environment developed by Microsoft Corporation. Based on the BASIC language, Visual Basic was one of the first products to provide a graphical programming environment and a paint metaphor for developing user interfaces. Instead of worrying about syntax details, the Visual Basic programmer can add a substantial amount of code simply by dragging and dropping controls, such as buttons and dialog boxes, and then defining their appearance and behavior.

However, code modules can be generated using any commercialized available software programs. Cash flow model 112 worksheets are arranged into four main categories of worksheets:

a) Data Sheet—Data sheet holds records retrieved from the database for distribution to resolution sheets. Resolution sheets are often referred to as Disposition sheets. Resolution or Disposition sheets describe various disposition asset types. Data sheet contains several additional calculated fields derived from the imported records and assumption sheet parameters.

b) Assumptions Sheet—Assumptions sheets are input sheet for various model parameters such as interest rates, legal fees, expenses, exchange rates, discount rates and various other parameters that are important in predicting the future situation.

c) Cash flow sheet—Cash flow sheet is the net present value model of aggregate projections of cash flows and expenses by likely asset disposition type.

d) Disposition Sheets—Disposition sheet is one sheet for each possible asset disposition strategy that may be employed in the asset collection effort. Possible disposition of assets are, but not limited to, Discounted Cash Payment or Discounted Pay Off (DPO) Disposition, Inferred Disposition, Loan Restructure Disposition, Compliance Disposition, Litigation with Foreclosure Disposition, Litigation with Restructure Disposition, and Deed In Lieu Disposition. Other disposition types may be developed depending on the type of the assets within the portfolio and the business needs.

Monte Carlo Simulation Model 114 is used with the assumptions and cash flow worksheets to perform sensitivity and "what if" analysis 120 on the projected cash flows. This allows for the impact of variation in the expected timing of recoveries, amount of recoveries, interest rates, expenses, and other variables to be analyzed. Simulation Model 114 provides a probabilistic distribution of possible portfolio value that incorporates the risk associated with uncertainty of future events.

Figure 5:
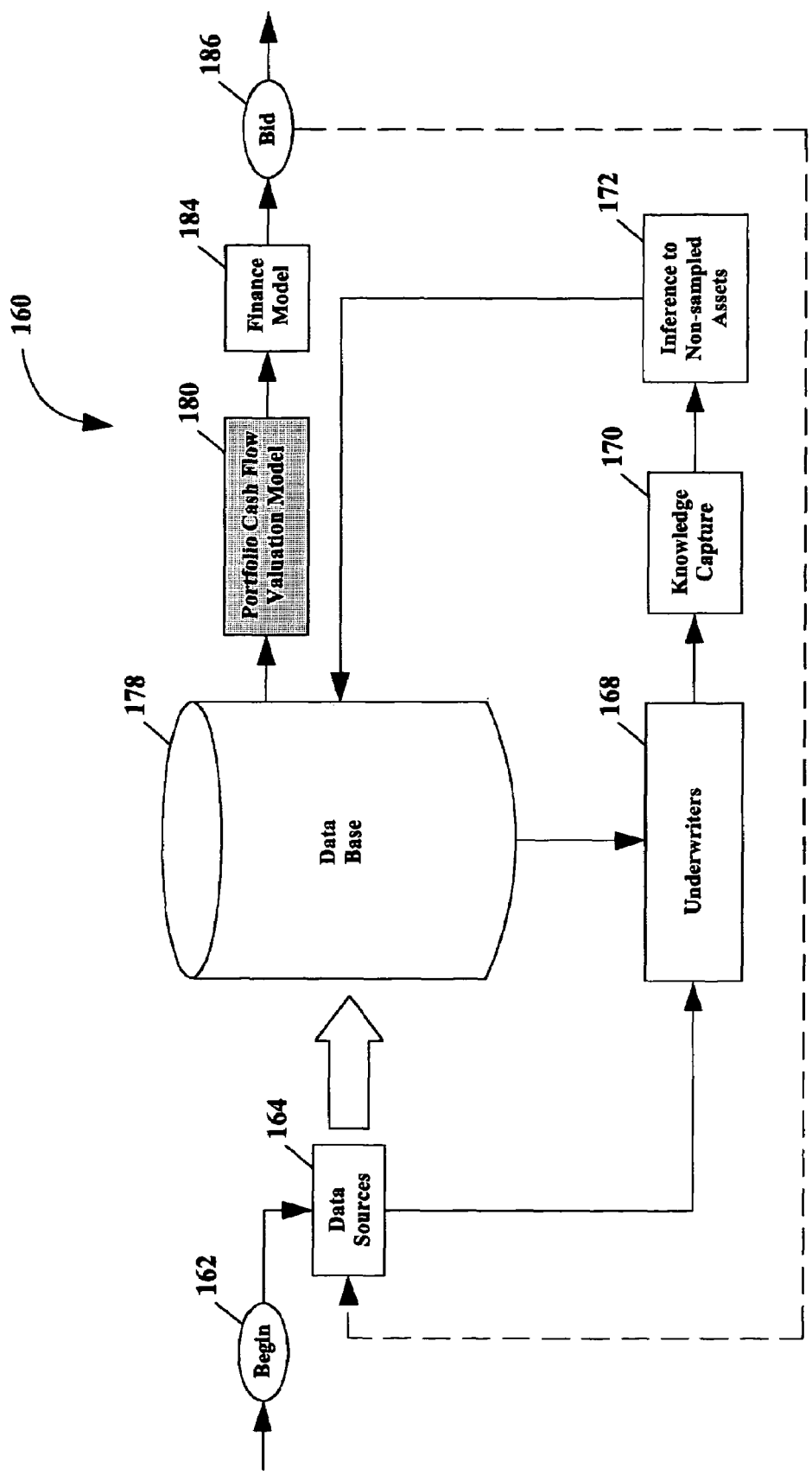
FIG. 5 describes a portfolio bidding process as implemented by the PCVS.

FIG. 5 describes a portfolio bidding process 160 as implemented by PCVS 10. Portfolio bidding process 160 begins 162 inputting required information relating to portfolio and its underlying assets including but not limited to identifying a Borrower Identification Code, a Loan Identification Code, Strategy description defining Disposition Type, Timing of Payments and other related information. Data Sources 164 includes the information relating to the portfolio and its underlying assets and information from loan underwriters 168, Knowledge Captured from Previous Transactions 170, and Inference Data obtained from Non-Sampled Assets 172. Data sources 164 are updated constantly and become part of a Database 178. Next step requires importing cash flow data from database 178 into Portfolio Cash Flow Valuation Model 180 (also shown in FIG. 4 as reference numeral 112). The user controlled query allows for segments of the portfolio or pool of assets to be evaluated separately. In an exemplary embodiment, Portfolio Cash Flow Valuation Model 180 automatically segments data by potential disposition types. Model 180 can also handle mixed disposition types of assets. Once the analysis is completed as explained below (in FIG. 6), cash flow model's projections are exported in the proper format into a Finance Model 184 for developing a Bid 186 for submission.

In an exemplary embodiment, a Borrower-level Pricing Process is implemented by PCVS 10. Borrower level Pricing Process is a module or a sub-set of the Cash Flow Model. In addition to retaining all the functionality of the Cash Flow Model, Borrower Level Pricing Process implements a looping feature that allows the user to run the Cash Flow Model for every borrower in the portfolio (as if a borrower were a portfolio of one), thereby calculating each borrower's net present value of cash flows, i,e. each borrower's price. The looping feature allows the user to run an analysis for any subset of portfolio, and calculate the subset's price, sensitivities, total expenses, etc. Once the borrower level pricing is determined, the system can calculate the price influence (also refereed to as "influence") of each borrower's individual price, on the entire portfolio's price by utilizing "influence metrics".

More specifically, in addition to a determination of a portfolio level price, a loop has been built into algorithm to calculate a borrower-specific price for each borrower in the portfolio. The Borrower level Pricing process includes clearing the database and sorting the database by borrower identification codes (i.e. Borrower Id's). All the records associated with each individual Borrower Id's are rolled up to get the overall contribution by each borrower for a given portfolio. The subsequent step of the process further includes price influence ranking which relates to determining influence of each borrower on a given portfolio. Price influence of a particular borrower is determined using:

$$p_{(i)} = \frac{\sum_{j \neq i} p_j B_j}{\sum_{j \neq i} B_j}$$

is borrower i's deleted price (price of portfolio without borrower i)

where $p_i$ =borrower i price, and $B_i$ is the borrower i unpaid balance

Then $$I_{(i)} = p_{(i)} - \frac{\sum_j p_j B_j}{\sum_j B_j}$$

is borrower i's price influence. If I>0, then borrower i is price deflationary, while if I<0, then borrower i is price inflationary. Rank ordering price influence for every borrower illuminates the price sensitivity to individual borrower pricing.

In an exemplary embodiment, price influence of a particular borrower is determined using "influence metrics". The "influence metrics" are developed based on historical experience in dealing with various portfolios. Once the price influence ranking is developed for each borrower based on influence metrics, the borrowers are rank-ordered according to their individual ranking. The most influential borrowers are then selected for further review. The process offers significant competitive pricing advantage and shortens the time needed for portfolio evaluation. The process adds accuracy and consistency in development of successful bids by focusing on borrowers that are most influential.

Figure 6:
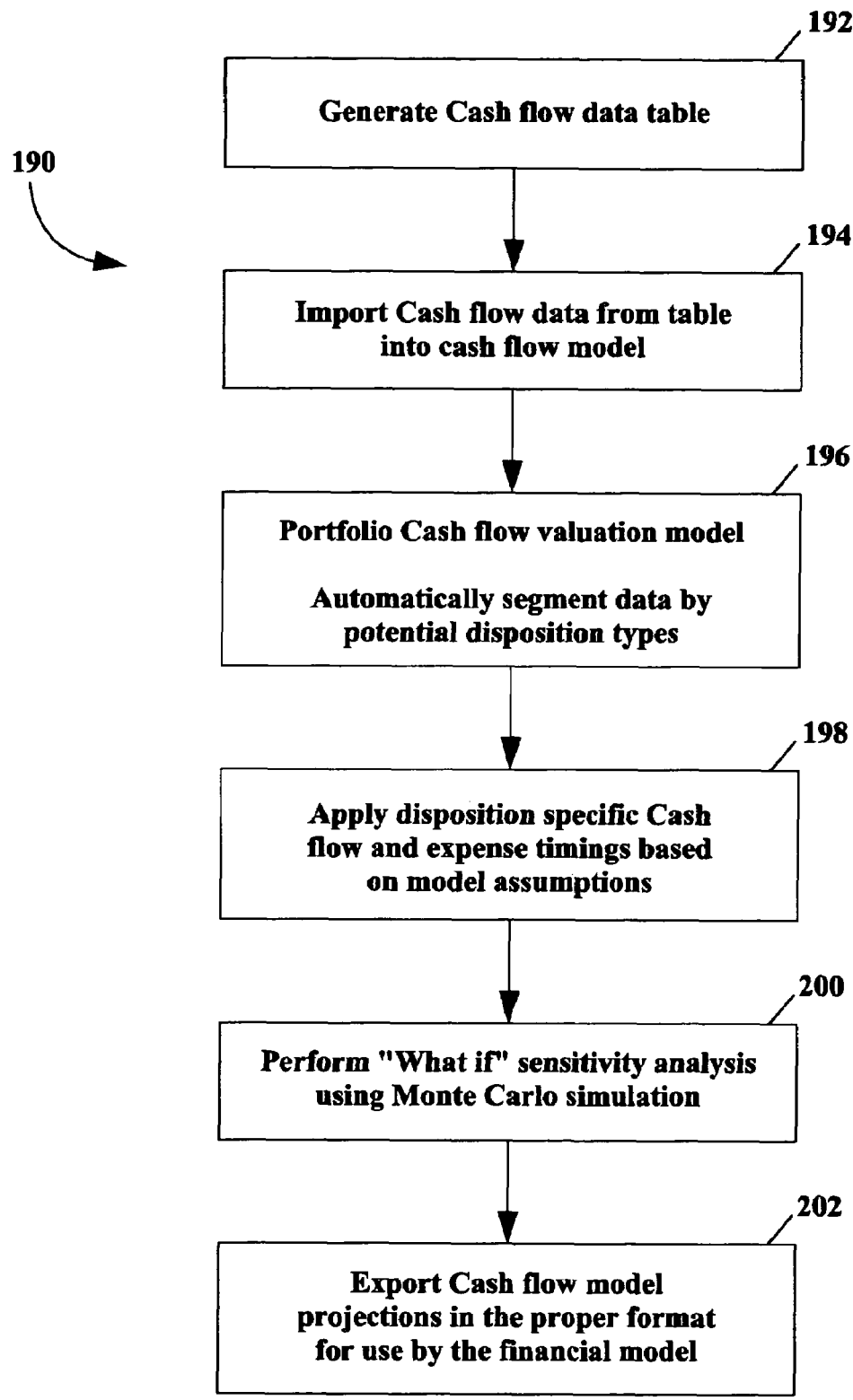
FIG. 6 describes, in one exemplary embodiment, a various process steps utilized by the PCVS in developing a bid that is financially sound.

FIG. 6 describes, in one exemplary embodiment, a various process steps 190 utilized by PCVS 10 in developing a bid that is financially sound. Process steps 190 utilize six different steps. Step One 192, in one exemplary embodiment, includes generating cash flow data table, also referred to as database 178 (shown in FIG. 5) from various data sources 164 (shown in FIG. 5). Data Sources 164 includes the information relating to portfolio and its underlying assets, information from loan underwriters 168 (shown in FIG. 5), Knowledge Captured from Previous Transactions 170 (shown in FIG. 5), and Inference Data obtained from Non-Sampled Assets 172 (shown in FIG. 5). Data sources 164 are updated constantly and become part of a Database 178. Step Two 194 involves importing cash flow data from data table 178 into cash flow valuation model 180 (shown in FIG. 5) utilizing EXCEL VBA program. Cash flow valuation model 180 is also referred to as Portfolio Cash Flow Valuation Model 180. The user controlled query allows the user to segment portfolio or pool of assets that need to be evaluated separately. Step Three 196 utilizes Portfolio Cash Flow Valuation Model 180 to automatically segment data by potential asset disposition types. In an exemplary embodiment, possible disposition of assets are, Discounted Cash Payment or Discounted Pay Off (DPO) Disposition, Inferred Disposition, Loan Restructure Disposition, Compliance Disposition, Litigation with Foreclosure, Litigation with Restructure Disposition, and Deed In Lieu Disposition. Although model 180 can segment data by a specific disposition type, the model with minor adjustments can also handle mixed dispositions. Step Four 198, then includes, applying disposition specific cash flow and expense timings based on model assumptions and rolling up discounted projections into a total deal level cash flow projections. Step Five 200 includes performing sensitivity analysis using Monte Carlo Simulation Model 114. This analysis is often referred to as a "What-If" analysis. This analysis provides different scenarios to the management based on different assumptions related to key parameters. PCVS 10 retrieves assumptions on which various scenarios are developed from the assumptions input sheet (discussed below). Step Six 202, exports cash flow model projections into the proper format for use by the Finance Model 184 (shown in FIG. 5) to develop bids 186 (shown in FIG. 5) that are financially attractive and provides strong probability of expected return on investment after taking into account foreseeable risks.

Figure 7A:
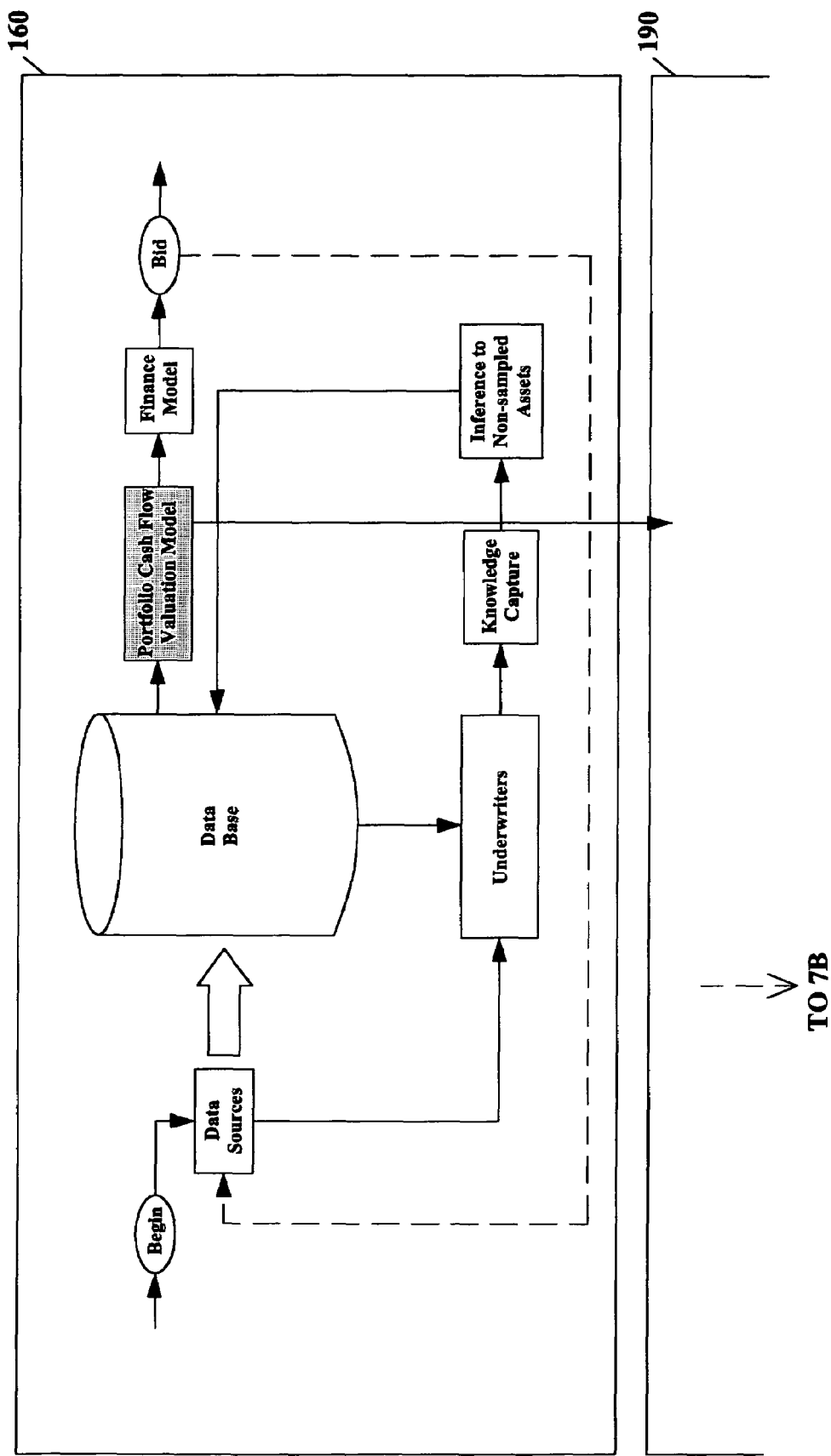
FIG. 7 is a diagram illustrating an overlap of the portfolio bidding process (shown in FIG. 5) and various process steps (shown in FIG. 6) utilized by the PCVS in developing a bid that is financially sound.
Figure 7B:
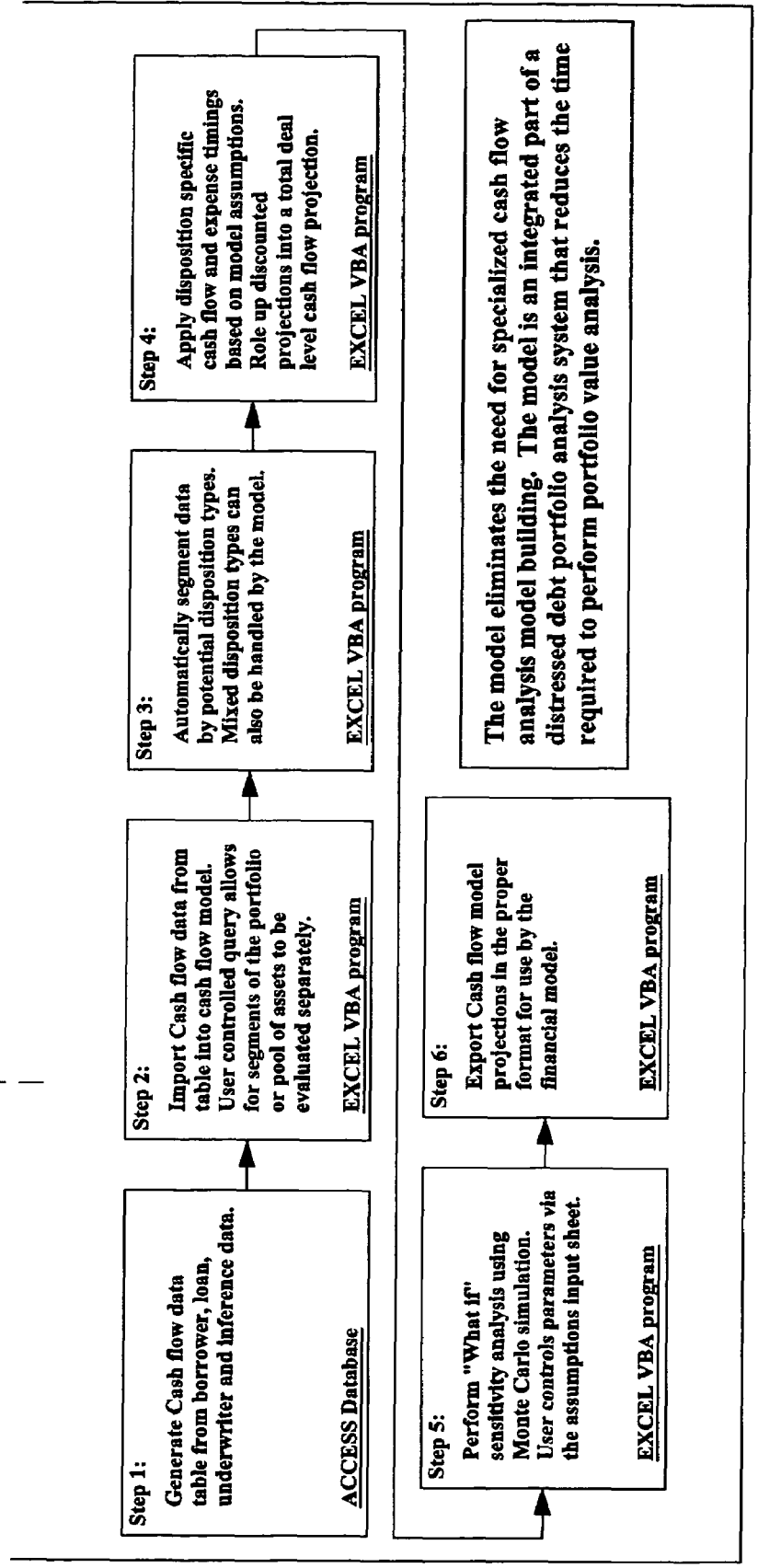

FIG. 7 is a diagram illustrating an overlap of portfolio bidding process 160 (shown in FIG. 5) and various process steps 190 (shown in FIG. 6) utilized by PCVS 10 in developing a bid that is financially sound.

Figure 8:
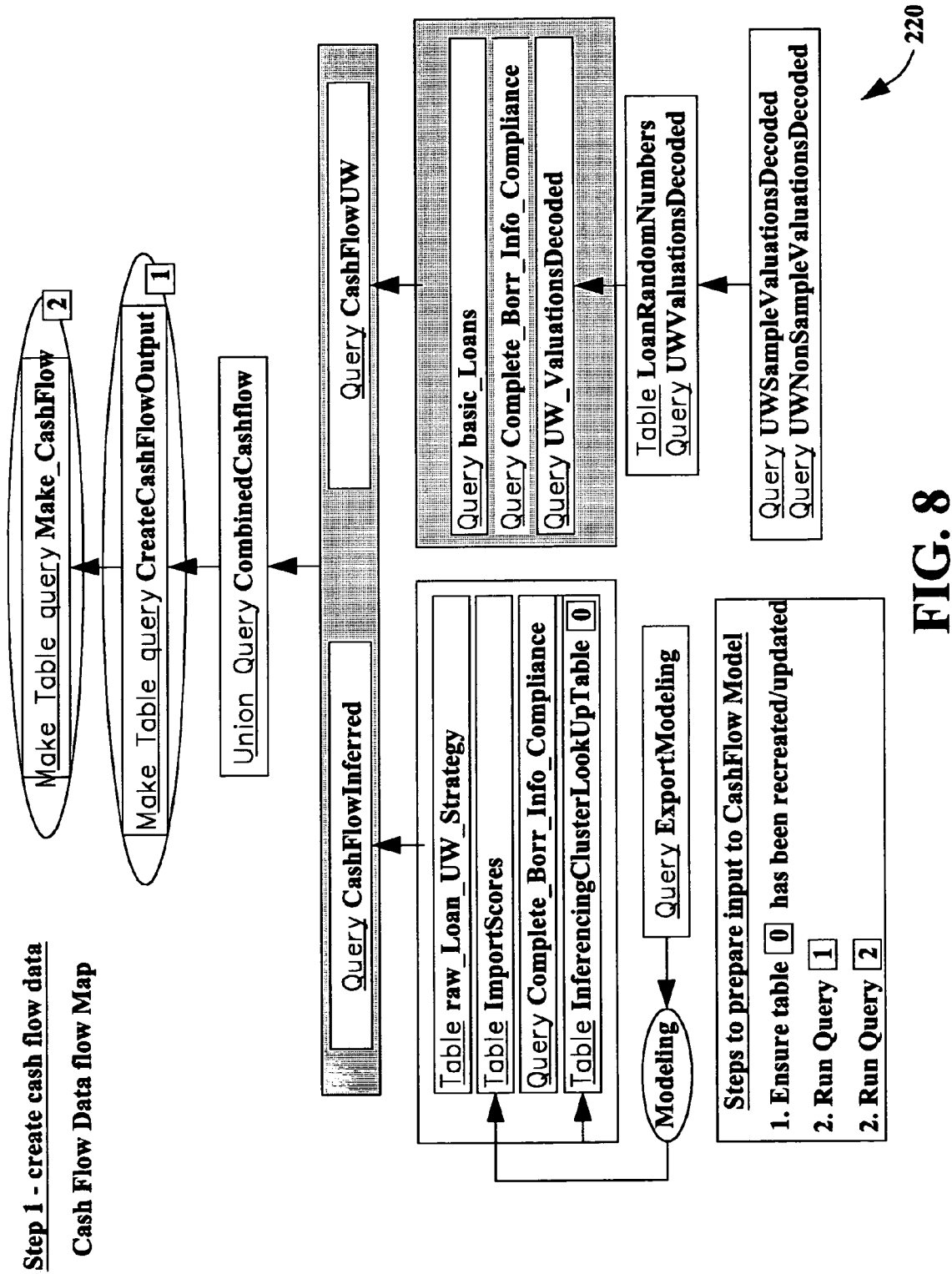
FIG. 8 is an exemplary embodiment of the process steps to create cash flow data table, also referred to as database 178 (shown in FIG. 5) from various data sources (shown in FIG. 5)

FIG. 8 is an exemplary embodiment of process steps 220 to create cash flow data table, also referred to as database 178 (shown in FIG. 5) from various data sources 164 (shown in FIG. 5). Various queries are ran to create cash flow data from database 178, which in turn generates cash flow table. Data queried from database 178 is placed into a data worksheet in the model 180 workbook.

Figure 9B:
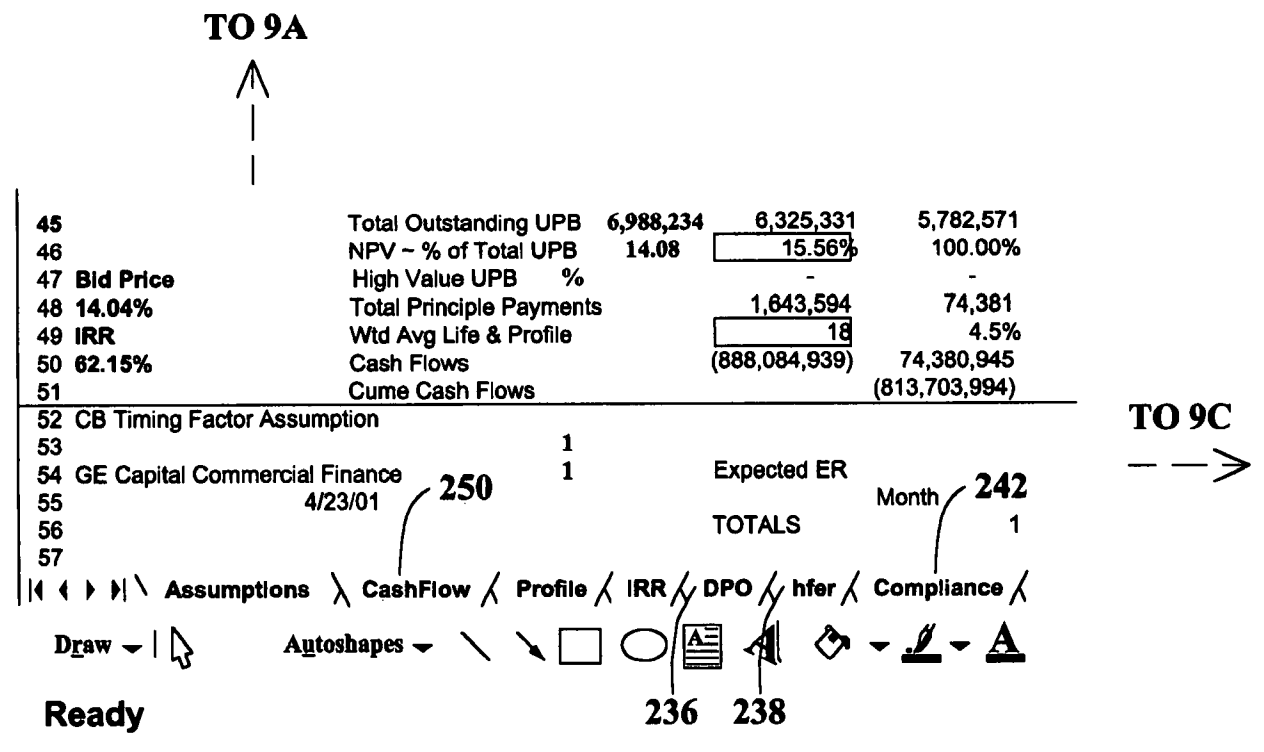
Figure 9C:
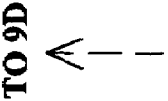
FIG. 9 is an exemplary embodiment of a user interface displaying the imported data from the cash flow model (shown in FIG. 5)

FIG. 9 is an exemplary embodiment of a user interface 230 displaying the imported data from the cash flow model 180 (shown in FIG. 5). A Load Cash Flow Model 232 button imports data into the cash flow model 180. A Move Data 234 button performs required computations and displays what is being shown in user interface 230. Move Data 234 command executes the "Move To Disposition" function. Move Data 234 command transfers each record data to the proper disposition type. FIG. 10 below, in an exemplary embodiment, depicts the raw data, which were inputted into database 178. Appropriate assumptions are retrieved from the assumption worksheet shown in FIG. 11 below. Expected Cash flow and Net Present Value (NPV) are computed based on received cash flow information, expenses and timings. The actual data are utilized as and when possible. However, when actual data are not available, model 180 retrieves necessary data from the assumption worksheet, shown in FIG. 11 to complete the analysis.

A VBA routine displays list of asset pools, or the user can select a specific pool of assets out of possible disposition of assets such as Discounted Cash Payment or Discounted Pay Off (DPO) Disposition 236, Inferred Disposition 238, Loan Restructure Disposition 240, Compliance Disposition 242, Litigation with Foreclosure Disposition 244, Litigation with Restructure Disposition 246, and Deed In Lieu Disposition 248. Alternatively, the user can select to view all available records by selecting a Cash Flow 250 tab. Each of these disposition types is available for viewing under the specific tab identified in FIG. 9.

Explanations of the calculation of the various disposition types are discussed below. However, it is important to note that the underlying explanations are for a specific point in time on a specific deal (or a transaction) and are only exemplary in nature. Minor adjustments may be made to these methodologies to accommodate a new deal depending on a Country where the transaction is being undertaken, Tax structure of the country, county and state, Tax and other Legal expenses, and general expenses based on the deal size. The model provides flexibility to accommodate these changes and provides reliable NPV and Return on Investment (ROI) values.

Discounted Pay Off (DPO) Disposition 236

DPO records are contained in the DPO Disposition 236 tab. DPO strategy involves two potential cash payments at two different timings, T1 and T2. Expenses are incurred at T1 and T2. Total outstanding Unpaid Balance (UPB) decreases as payments are received. The aggregate cash flows and expenses are totaled at the top of the worksheet.

Timings:

Various timings are obtained as part of the underwriting data from the database 178. The timings are adjusted during the "move data" function utilizing the "Delays by UPB bin" section on the assumptions worksheet (shown in FIG. 11). Each record's payment and expense timings are adjusted based on the UPB bin that the record is associated with.

Expenses:

Legal expenses are incurred at the time of the cash payments. Legal expenses are calculated as a percentage of the recovered amount. The percentage used is obtained from the "Legal fees based on % recovered UPB." DPO expenses are calculated during the "move data" function and placed in the expense section of the DPO Disposition 236 tab according the payment timing.

All legal expenses are adjusted using the Value Added Tax (VAT) located on the assumptions worksheet.

EXAMPLE

Expected Recovery (ER) is the amount realized from the borrower or a debtor. In other words, ER is the payment from the borrower. In an exemplary embodiment, let us assume that for, ER=$842,238, the borrower is expected to make payments at Time period T1 (T1)=12 and at Time period T2 (T2)=18. Based on the facts of a specific scenario, ReSecured=1 implying that the loan is secured by the real property. In other words, there is a collateral. Based on these facts, the Results computed by the model are as follows:

Cash payment at Time Period 12 of $421,119

Cash payment at Time Period 18 of $421,119

Expenses are retrieved from assumption worksheet stored in database 178. For example, to obtain Legal Expenses at T1, the model retrieves the data from "legal ReSecured" and determines that the legal expenses are 13.8% of Cash payment at $421,111, which is $58,114 Million ($421,111 Million multiplied by 0.138 factor retrieved from the assumption worksheet). Similarly, Legal Expenses at T2 are 13.8% of Cash payment at $421,118, which is $58,114 Million ($421,111 Million multiplied by 0.138 factor retrieved from the assumption worksheet).

Inferred Disposition 238

Inferred records are contained in the Inferred Disposition 238 tab. Inferred strategy involves two potential cash payments, T1 and T2. Expenses are incurred at T1 and T2. Total outstanding Unpaid Balance (UPB) decreases as payments are received. The aggregate cash flows and expenses are totaled at the top of the worksheet.

Timings:

Various timings are obtained as part of the underwriting data from the database 178. The timings are adjusted during the "move data" function utilizing the "Delays by UPB bin" section on the assumptions worksheet (shown in FIG. 11). Each record's payment and expense timings are adjusted based on the UPB bin that the record is associated with.

Expenses:

Legal expenses are incurred at the time of the cash payments. Legal expenses are calculated as a percentage of the recovered amount. The percentage used is obtained from the "Legal fees based on % recovered UPB." Inferred expenses are calculated during the "move data" function and placed in the expense section of the Inferred Disposition 238 tab according the payment timing.

All legal expenses are adjusted using the Value Added Tax (VAT) located on the assumptions worksheet.

EXAMPLE

For, Expected Recovery (ER)=$1,092.52, Time period T1 (T1)=26, Time period T2 (T2)=48, ReSecured=1; the Results computed by the model are as follows:

Cash payment at Time Period 26 of $1073.00

Cash payment at Time Period 48 of $19.52

Expenses are retrieved from assumption worksheet stored in database 178. For example, to obtain Legal Expenses at T1, the model retrieves the data from "legal ReSecured" and determines that the legal expenses are 23% of Cash payment at $1073.00, which is $246.8 Million ($1073 Million multiplied by 0.23 factor retrieved from the assumption worksheet). Similarly, Legal Expenses at T2 are 23% of Cash payment at $19.52, which is $4.49 Million ($19.52 Million multiplied by 0.23 factor retrieved from the assumption worksheet).

Loan Restructure Disposition 240

Restructured loans Disposition records are contained in "Restruct" 240 tab. Restructured loans strategy involves a possible cash payment "T1" and a stream of future payments associated with the new restructured loan. The restructured loan may involve a principle moratorium period where in only interest payments are made.

The cash flows that result from the restructured loan are contained in two sections of the worksheet. The first section contains the T1 cash payment and the principle payments associated with the loan. This section also contains a cash payment associated with any remaining principle value beyond the term of the analysis (48 months), the remaining value is discounted back at a separate "Residual value discount rate" located on the assumptions sheet. Principle payments are calculated using the PPMT excel function. The second section contains the interest payments associated with the loan. The interest rate is obtained from the "Assumed interest rate (Monthly)" value on the assumptions sheet. The IPMT excel function is used to calculate the interest portion of the cash flow stream. Details pertaining to PPMT and IPMT functions, Timings, Expenses, and an illustrative Example describing methodology are summarized in Appendix-A.

Compliance Disposition 242

Compliance Disposition records are contained in "Compliance" 242 tab. Compliance records are handled in the same fashion as the DPO strategy using two potential cash payments, T1 and T2. Expenses are incurred at T1 and T2. Total outstanding UPB is decreased as payments are received. There are three types of Compliance records "Grey-White", "Grey-Black" and "Black". The aggregate cash flows and expenses for each type are totaled at the top of the worksheet. Details pertaining to Timings, Expenses, and an illustrative Example describing methodology are summarized in Appendix-A.

Litigation With Restructured Loans 246

Litigation With Restructured loans are contained in the "LitigateWRes" 246 tab. Litigation With Restructured loans strategy involves a cash payment "T1" and a possible stream of future payments associated with the new restructured loan.

The cash flows that result from this strategy are contained in two sections of the worksheet. The first section contains the T1 cash payment and the principle payments associated with the loan. This section also contains a cash payment associated with any remaining principle value beyond the term of the analysis (48 months), the remaining value is discounted back at a separate "Residual value discount rate" located on the assumptions sheet. Principle payments are calculated using the PPMT excel function. The second section contains the interest payments associated with the loan. The interest rate is obtained from the "Assumed interest rate (Monthly)" value on the assumptions sheet. The IPMT excel function is used to calculate the interest portion of the cash flow stream. Details pertaining to PPMT and IPMT functions, Timings, Expenses, and an illustrative Example describing methodology are summarized in Appendix-A.

Litigation With Foreclosure 244

Litigation With Foreclosure records are contained in the "LitigateForeClose" 244 tab. This strategy involves two events "T1" and "T2". T1 can be either the event of obtaining ownership via foreclosure or obtaining ownership and selling the property in the same event. If T1 is a sales transaction then there would be no T2 event. T2 will occur when the obtaining ownership event and sales events are at different timings. The first section contains the T1 OR T2 cash payment and represent the recovered amount associated with the sales transaction. Timings are obtained as part of the underwriting data from the database. Timings are adjusted during the "move data" function utilizing the "Delays by UPB bin" section on the assumptions page. Each record's event timings are adjusted based on the UPB bin that the record is associated with.

Expenses are calculated in the second section of the worksheet. Legal expenses are incurred at the time of each event and are calculated as a percentage of the recovered amount. The percentage used is obtained from the "Legal fees based on % recovered UPB". In addition to legal expenses, restate transaction expenses are incurred at each event. These expenses are obtained from the "Closing Costs Table LF and DIL (% of GDP)" section of the assumptions sheet.

Some of these expenses are incurred at both events, (Pub Notary, Pub Registry, State Aq. Tax, Appraisal Fee and Brokerage fees) Other are dependent on the "Resecured" and "InLitigation" fields. Other details pertaining to Litigation With Foreclosure and an illustrative Example describing methodology are summarized in Appendix-A.

Deed in Lieu 248

Deed In Lieu records are contained in the "DeedInLieu" 248 tab. Deed In Lieu strategy involves two events "T1" and "T2". T1 can be either the event of obtaining ownership via foreclosure or obtaining ownership and selling the property in the same event. If T1 is a sales transaction then there would be no T2 event. T2 will occur when the obtaining ownership event and sales events are at different timings.

The first section contains the T1 OR T2 cash payment and represent the recovered amount associated with the sales transaction. Timings are obtained as part of the underwriting data from the database. They are adjusted during the "move data" function utilizing the "Delays by UPB bin" section on the assumptions page. Each record's event timings are adjusted based on the UPB bin that the record is associated with. Other details pertaining to Deed in Lieu and an illustrative Example describing methodology are summarized in Appendix-A.

FIG. 10 is an exemplary embodiment of a spreadsheet 260 depicting the raw data, which were inputted into database 178. The data is segregated by a borrower identification number, a loan identification number, an asset type and other related attributes.

FIG. 11 is an exemplary embodiment of an Assumption Sheet 270 also referred to as Assumption Data Sheet or Assumption Worksheet. Appropriate assumptions are stored in database 20 and are retrieved as necessary. Expected Cash flow and Net Present Value (NPV) are computed based on received cash flow information, expenses and timings. The actual data are utilized as and when possible. However, when actual data are not available, model 180 retrieves necessary data from the assumption worksheet, shown in FIG. 11 to complete the analysis. Assumption worksheet includes assumptions related to many different variables including, but not limited to, Disposition Discount Rates, Value Added Tax Rates, Set Up Costs, Conversion and Loan Registration Costs, Asset Management expenses, Legal Fees based on Recovered Amount, Closing Costs related to Different Disposition Types, Various Different Rates and Factors, Economic Data, Sensitivity Assumptions and Financial Variables that are necessary in performing financial analysis. Assumptions are also changed by the user to control disposition expenses and discount rates.

Figure 12C:
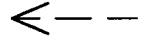
FIG. 12 is an exemplary embodiment of a spreadsheet depicting a roll up disposition cash flow into portfolio cash flow.

FIG. 12 is an exemplary embodiment of a spreadsheet 280 depicting a roll up disposition cash flow into portfolio cash flow. In this example, each disposition cash flow 282 and expense 284 totals are linked to develop overall portfolio roll up cash flow 286. Portfolio cash flow 286 is made up of cash flows from various disposition types including, but not limited to, Discounted Cash Payment or Discounted Pay Off (DPO) Disposition 288, Inferred Disposition 290, Loan Restructure Disposition 292, Compliance Disposition 294, Litigation with Restructure Disposition 296, Litigation with Foreclosure Disposition 298, and Deed In Lieu Disposition 300. Global expenses and discount rate assumptions are applied from assumption worksheet 302 (also shown in FIG. 11). Monte Carlo Simulation Model 114 is used to test the impact of the uncertainty associated with assumptions. Results are exported in a pre-determined format to feed the financial modeling process (shown in FIG. 14).

Figure 13B:
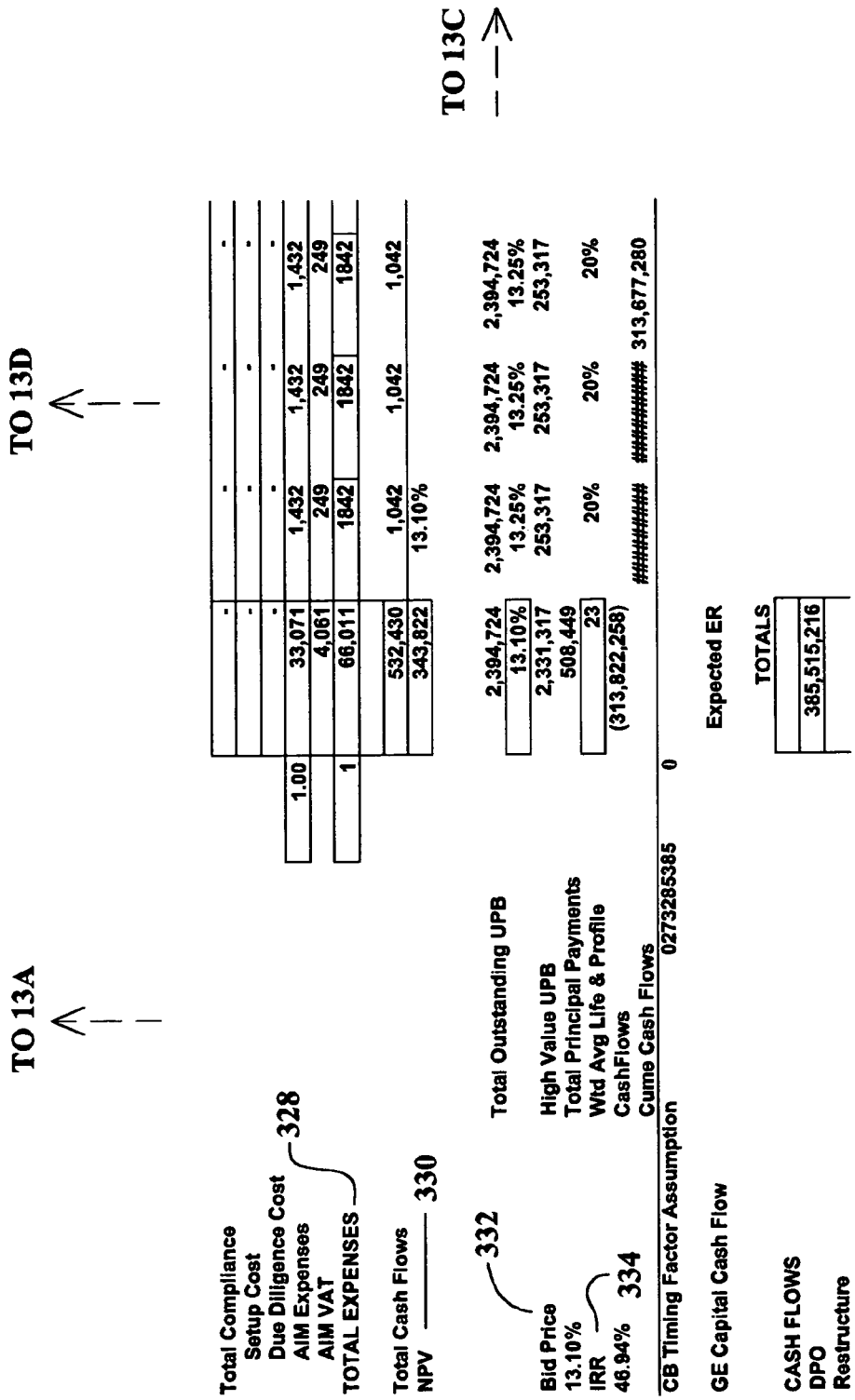
FIG. 13 is an exemplary embodiment of simulation results.
Figure 13C:
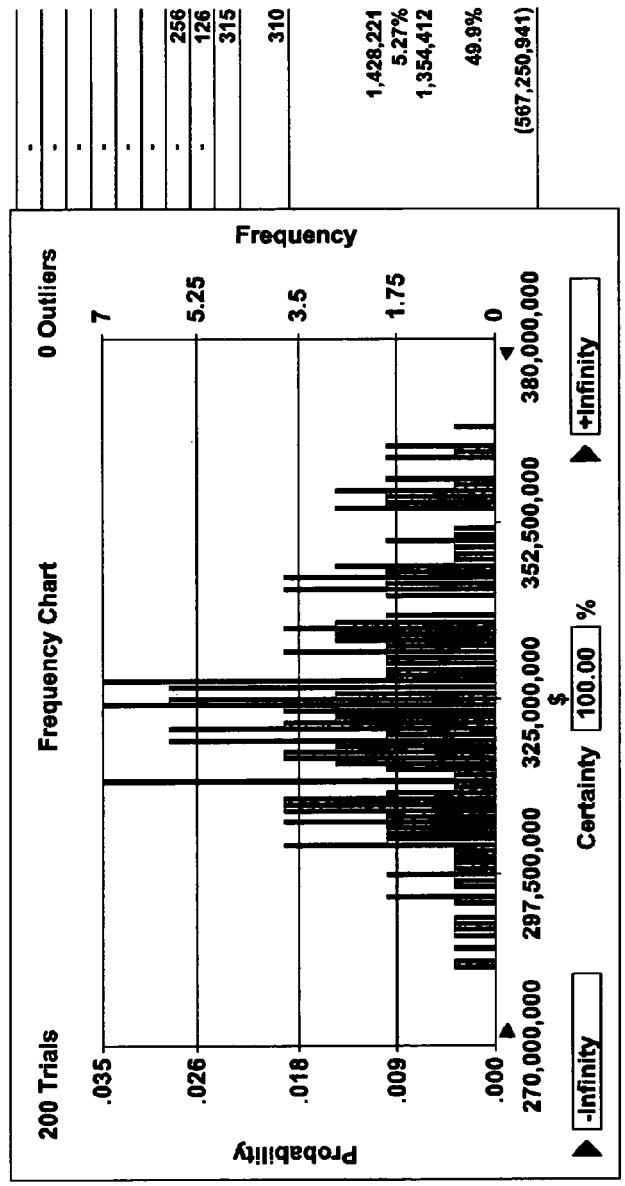
Figure 13D:
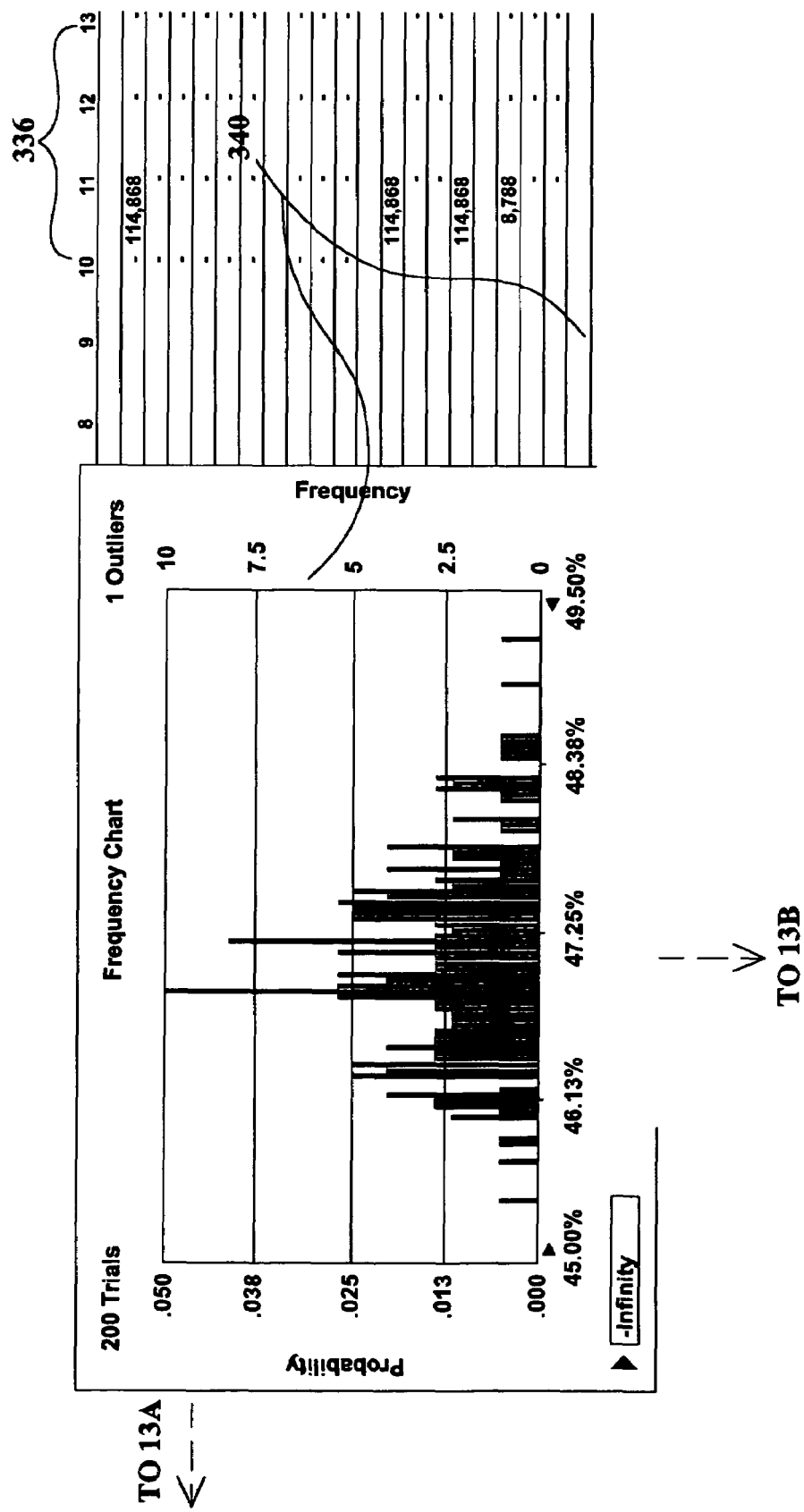

FIG. 13 is an exemplary simulation results. FIG. 13 depicts a spreadsheet 320 identifying Cash flows relating to each disposition type 322, Expenses related to each disposition type 324, Total Cash Flow 326, Total Expenses 328, Net Present Value (NPV) 330, Bid Price 332, and an Internal Rate of Return (IRR) 334. Cash flows and expenses are segregated over a specific period, i.e. month by month 336. Pop up windows 340 allow the user to view the results relating to IRR and Time Adjusted NPV and help forecast the success of a specific bid.

Figure 14A:
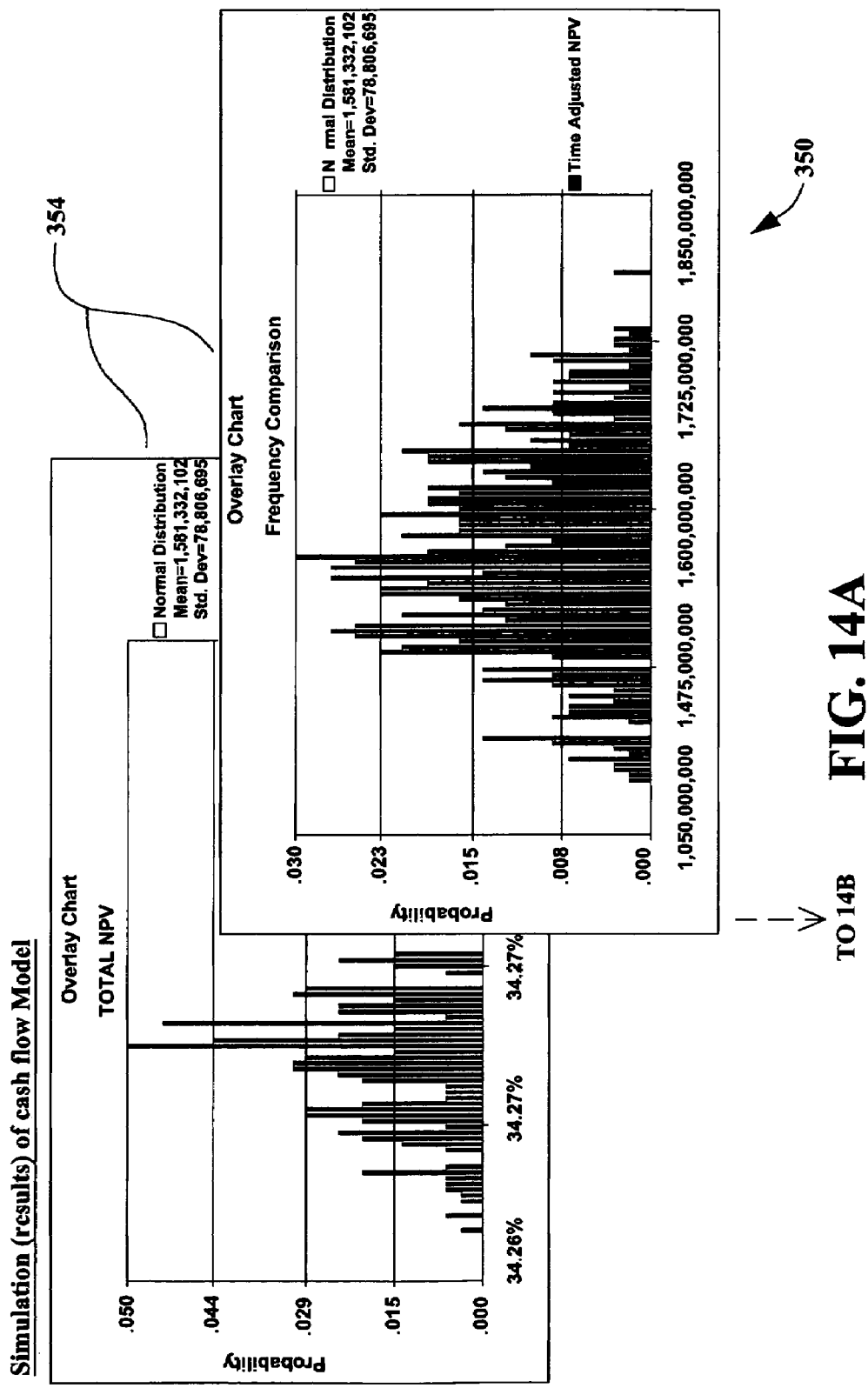
FIG. 14 is an exemplary embodiment of a spreadsheet showing possible result distributions based on uncertainty and variability of future cash flows.
Figure 14B:
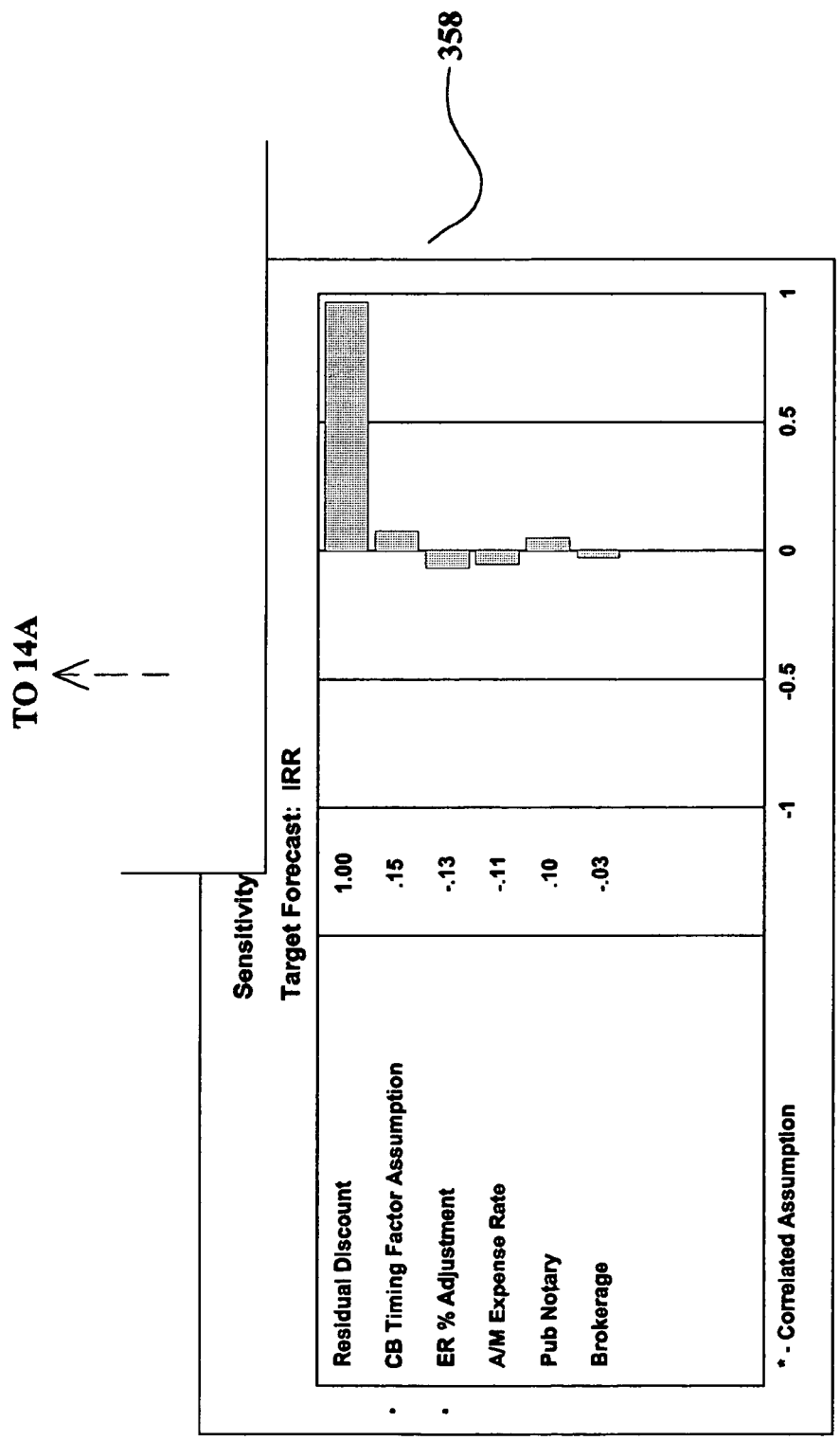

FIG. 14 is an exemplary embodiment of a spreadsheet 350 showing possible result distributions 354 based on uncertainty and variability of future cash flows. Spreadsheet 350 also depicts sensitivity analysis 358 on key input parameters.

While the invention has been described in terms of various specific embodiments, those skilled in the art will recognize that the invention can be practiced with modification within the spirit and scope of the claims.

APPENDIX-A

Calculations for the individual disposition types enclosed here are general in form and can easily be modified to reflect slight changes in disposition structure from deal to deal.

DPO—Discounted Pay Off—strategy involves two potential cash payments, timing 1 (T1) and timing 2 (T2). Expenses are incurred at T1 and T2. Total outstanding Unpaid balance (UPB) is decreases as payments are received. There are two types of DPO records Easy and Hard DPOs, The aggregate cash flows and expenses for each type are totaled at the top of the worksheet.

Timings:

Timings are obtained as part of the underwriting data from the database. They are adjusted during the "move data" function utilizing the "Delays by UPB bin" section on the assumptions page. Each record's payment and expense timings are adjusted based on the UPB bin that the record is associated with.

Expenses:

Legal expenses are incurred at the time of the cash payments. These expenses are calculated as a percentage of the recovered amount. The percentage used is obtained from the "Legal fees based on % recovered UPB". DPO expenses are calculated during the "move data" function and placed in the expense section of the DPO tab according the payment timing.

All legal expense are adjusted using the Value added tax (VAT) tax also located on the assumptions page.

EXAMPLE

Expected Recovery (ER)=$842,238, T1=12 months, T2=18 months ReSecured=1 a secured loan
   flag:
   Results:
Cash payment at Time 12 of 421,119
Cash payment at Time 18 of 421,119
   Expenses:
T1 Legal—Lookup in legal ReSecured 421,119=13.8%; Expense=58,114
T2 Legal—Lookup in legal ReSecured 421,119=13.8%; Expense=58,114

These values are calculated and placed in the correct timing slot in on the DPO tab during the move data function execution.

Inferred records are generated via proprietary technology and involve two potential cash payments, T1 and T2. Expenses are incurred at T1 and T2. Total outstanding UPB is decreases as payments are received. The aggregate cash flows and expenses are totaled at the top of the worksheet.

Timings:

Timings are obtained as part of the underwriting data from the database. They are adjusted during the "move data" function utilizing the "Delays by UPB bin" section on the assumptions page. Each record's payment and expense timings are adjusted based on the UPB bin that the record is associated with.

Expenses:

Legal expenses are incurred at the time of the cash payments. These expenses are calculated as a percentage of the recovered amount. The percentage used is obtained from the "Legal fees based on % recovered UPB". Inferred expenses are calculated during the "move data" function and placed in the expense section of the Infer tab according the payment timing.

All legal expense are adjusted using the VAT tax also located on the assumptions page.

EXAMPLE

ER=$1,092.52, T1=26, T2=48 ReSecured=1:
   Results
Cash payment at Time 26 of 1073
Cash payment at Time 48 of 19.51
   Expenses:
T1 Legal—Lookup in legal ReSecured 1073=23%; Expense=246.8
T2 Legal—Lookup in legal ReSecured 19.51=23%; Expense=4.487

Compliance records refer to questionable borrowers due to legal of other circumstances and are handled in the same fashion as the DPO strategy using two potential cash payments, T1 and T2. Expenses are incurred at T1 and T2. Total outstanding UPB is decreases as payments are received. There are three types of Compliance records "Grey-White", "Grey-Black" and "Black", The aggregate cash flows and expenses for each type are totaled at the top of the worksheet.

Timings:

Timings are obtained as part of the underwriting data from the database. They are adjusted during the "move data" function utilizing the "Delays by UPB bin" section on the assumptions page. Each record's payment timings are adjusted based on the UPB bin that the record is associated with.

Expenses:

Legal expenses are incurred at the time of the cash payments. These expenses are calculated as a percentage of the recovered amount. The percentage used is obtained from the "Legal fees based on % recovered UPB". Compliance record expenses are calculated during the "move data" function and placed in the expense section of the Compliance tab according the payment timing.

All legal expense are adjusted using the VAT tax also located on the assumptions page.

EXAMPLE

ER=$2,675,443, T1=18, ReSecured=1:
   Results:
One cash payment at Time 18 of 2,675,443
   Expenses:
   T1 Legal—Lookup in legal ReSecured 2,675,443=7.59%; Expense=203,066

Restructured loans are contained in the "Restruct" tab. This strategy involves a possible cash payment "T1" and a stream of future payments associated with the new restructured loan. The restructured loan may involve a principle moratorium period where in only interest payments are made.

Cash Flows:

The cash flows that result from the restructured loan are contained in two sections of the worksheet. The first section contains the T1 cash payment and the principle payments associated with the loan. This section also contains a cash payment associated with any remaining principle value beyond the term of the analysis (48 months), the remaining value is discounted back at a separate "Residual value discount rate" located on the assumptions sheet. Principle payments are calculated using the PPMT excel function.

The format of the PPMT function is:

Returns the payment on the principal for a given period for an investment based on periodic, constant payments and a constant interest rate.

Syntax:

PPMT(rate,per,nper,pv,fv,type)

Rate is the interest rate per period.

Per specifies the period and must be in the range 1 to nper.

Nper is the total number of payment periods in an annuity.

Pv is the present value ¾ the total amount that a series of future payments is worth now.

Fv is the future value, or a cash balance you want to attain after the last payment is made. If fv is omitted, it is assumed to be 0 (zero), that is, the future value of a loan is 0.

Type is the number 0 or 1 and indicates when payments are due.

Set type equal to If payments are due (0 or omitted At the end of the period, 1 At the beginning of the period)

PPMT(Assumptions!$D$5,($L$19:$BG$19)−$F21, ($G21-$F21),$E21,0,0) This is applied only if the period/month falls within the loan period.

| | |
|---|---|
| Assumptions!$D$5 = | monthly interest rate |
| ($L$19:$BG$19)-$F21 = | This period/month minus the period/month that the interest only payments end. |
| ($G21-$F21) = | Length of loan - Nper - last payment timing minus end of interest only period. |
| $E21 = | Lon Amount |
| 0 = | FV = 0 |
| 0 = | Payment received at end of period. |

The second section contains the interest payments associated with the loan. The interest rate is obtained from the "Assumed interest rate (Monthly)" value on the assumptions sheet. The IPMT excel function is used to calculate the interest portion of the cash flow stream.

The format of the IPMT function is:

Returns the interest payment for a given period for an investment based on periodic, constant payments and a constant interest rate. For a more complete description of the arguments in IPMT and for more information about annuity functions, see PV.

Syntax

IPMT(rate,per,nper,pv,fv,type)

Rate is the interest rate per period.

Per is the period for which you want to find the interest and must be in the range 1 to nper.

Nper is the total number of payment periods in an annuity.

Pv is the present value, or the lump-sum amount that a series of future payments is worth right now.

Fv is the future value, or a cash balance you want to attain after the last payment is made. If fv is omitted, it is assumed to be 0 (the future value of a loan, for example, is 0).

Type is the number 0 or 1 and indicates when payments are due. If type is omitted, it is assumed to be 0.

IPMT(Assumptions!$D$5,($BK$19:$DF$19)−D21, ($G21−$D21),$E21) This is applied only if a interest payment month is encountered.

| | |
|---|---|
| Assumptions!$D$5 = | monthly interest rate |
| ($BK$19:$DF$19)-D21 = | This period/month minus the T1 period/month that represent the start of the loan. |
| ($G21-$D21) = | The length of the loan period |
| $E21 = | The Loan Amount. |
| Omitted = | FV = 0. |
| Omitted = | Payment received at end of period. |

Timings:

Timings are obtained as part of the underwriting data from the database. They are adjusted during the "move data" function utilizing the "Delays by UPB bin" section on the assumptions page. Each record's payment timings are adjusted based on the UPB bin that the record is associated with.

T1 is the timing of the cash payment.

T1+MonthsOfFinancing field=length of loan.

T1+MonthsOfPrincMoratorium=length of interest only period.

Expenses:

Legal expenses are incurred at the time of the cash payment and at the start of the principle payment period and are calculated as a percentage of the recovered amounts (Cash Payment at T1 and the Loan Amount). The percentage used is obtained from the "Legal fees based on % recovered UPB".

All legal expense are adjusted using the VAT tax also located on the assumptions page.

EXAMPLE

ER=$819,285, T1=9, T2=12, ReSecured=0:

Results:

One cash payment at Time 9 of 40,964

Loan start Principle+Interest Time 12, loan Amount=778,320

Expenses:

T1 Legal—Lookup in legal Not secured 40,964=28.75%; Expense=11,777

T2 Legal—Lookup in legal Not secured 778,320=11.5%; Expense=89,507

Litigation With Restructured loans are contained in the "LitigateWRes" tab. This strategy involves a cash payment "T1" and a possible stream of future payments associated with the new restructured loan.

Cash Flows:

The cash flows that result from this strategy are contained in two sections of the worksheet. The first section contains the T1 cash payment and the principle payments associated with the loan. This section also contains a cash payment associated with any remaining principle value beyond the term of the analysis (48 months), the remaining value is discounted back at a separate "Residual value discount rate" located on the assumptions sheet. Principle payments are calculated using the PPMT excel function.

The format of the PPMT function is:

Returns the payment on the principal for a given period for an investment based on periodic, constant payments and a constant interest rate.

Syntax:

PPMT(rate,per,nper,pv,fv,type)

Rate is the interest rate per period.

Per specifies the period and must be in the range 1 to nper.

Nper is the total number of payment periods in an annuity.

Pv is the present value of the total amount that a series of future payments is worth now.

Fv is the future value, or a cash balance you want to attain after the last payment is made. If fv is omitted, it is assumed to be 0 (zero), that is, the future value of a loan is 0.

Type is the number 0 or 1 and indicates when payments are due.

Set type equal to If payments are due (0 or omitted At the end of the period, 1 At the beginning of the period)

PPMT(Assumptions!$D$5,($M$19:$BH$19)−$F21, ($G21−$F21),$E21,0,0) This is applied only if the period/month falls within the loan period.

| | |
|---|---|
| Assumptions!$D$5 = | monthly interest rate |
| ($M$19:$BH$19)−$F21 = | This period/month minus the period/month that the interest only payments end. |
| ($G21−$F21) = | Length of loan - Nper - loan end minus loan start. |
| $E21 = | Lon Amount |
| 0 = | FV = 0 |
| 0 = | Payment received at end of period. |

The second section contains the interest payments associated with the loan. The interest rate is obtained from the "Assumed interest rate (Monthly)" value on the assumptions sheet. The IPMT excel function is used to calculate the interest portion of the cash flow stream.

The format of the IPMT function is: Returns the interest payment for a given period for an investment based on periodic, constant payments and a constant interest rate. For a more complete description of the arguments in IPMT and for more information about annuity functions, see PV.

Syntax

IPMT(rate,per,nper,pv,fv,type)

Rate is the interest rate per period.

Per is the period for which you want to find the interest and must be in the range 1 to nper.

Nper is the total number of payment periods in an annuity.

Pv is the present value, or the lump-sum amount that a series of future payments is worth right now.

Fv is the future value, or a cash balance you want to attain after the last payment is made. If fv is omitted, it is assumed to be 0 (the future value of a loan, for example, is 0).

Type is the number 0 or 1 and indicates when payments are due. If type is omitted, it is assumed to be 0.

IPMT(Assumptions!$D$5,($BK$19:$DF$19)−D21, ($G21−$D21),$E21) This is applied only if a interest payment month is encountered.

| | |
|---|---|
| Assumptions!$D$5 = | monthly interest rate |
| ($BK$19:$DF$19)−D21 = | This period/month minus the T1 period/month that represent the start of the loan. |
| ($G21−$D21) = | The length of the loan period |
| $E21 = | The Loan Amount. |
| Omitted = | FV = 0. |
| Omitted = | Payment received at end of period. |

Timings:

Timings are obtained as part of the underwriting data from the database. They are adjusted during the "move data" function utilizing the "Delays by UPB bin" section on the assumptions page. Each record's payment timings are adjusted based on the UPB bin that the record is associated with.

T1 is the timing of the cash payment.

T1+MonthsOfFinancing field=length of loan.

T1+MonthsOfPrincMoratorium=length of interest only period.

Expenses:

Legal expenses are incurred at the time of the cash payment and at the start of the principle payment period and are calculated as a percentage of the recovered amounts (Cash Payment at T1 and the Loan Amount). The percentage used is obtained from the "Legal fees based on % recovered UPB".

All legal expense are adjusted using the VAT tax also located on the assumptions page.

EXAMPLE

ER=$9,134,497, T1=36, ReSecured=0

Results:

One cash payment at Time 36 of $9,134,497.

Expenses:

T1 Legal—Lookup in legal Not secured 9,134,497=4.60%; Expense=$420,187

Litigation With Foreclosure records are contained in the "LitigateForeClose" tab. This strategy involves two events "T1" and "T2". T1 can be either the event of obtaining ownership via foreclosure or obtaining ownership and selling the property in the same event. If T1 is a sales transaction then there would be no T2 event. T2 will occur when the obtaining ownership event and sales events are at different timings.

Cash Flows:

The first section contains the T1 OR T2 cash payment and represent the recovered amount associated with the sales transaction.

Timings:

Timings are obtained as part of the underwriting data from the database. They are adjusted during the "move data" function utilizing the "Delays by UPB bin" section on the assumptions page. Each record's event timings are adjusted based on the UPB bin that the record is associated with.

NOTE: Any Timing beyond 48 months will occur in the 48th month.

Expenses:

Expenses are calculated in the second section of the worksheet.

Legal expenses are incurred at the time of each event and are calculated as a percentage of the recovered amount. The percentage used is obtained from the "Legal fees based on % recovered UPB".

In addition to legal expenses, restate transaction expenses are incurred at each event. These expenses are obtained from the "Closing Costs Table LF and DIL (% of GDP)" section of the assumptions sheet. some of these expenses are incurred at both events, (Pub Notary,Pub Registry,State Aq. Tax, Appraisal Fee and Brokerage fees)

Other are dependent on the Resecured and InLitigation fields:

If the record is Real-estate secured ReSecured=1 then Certificate filing fees apply If the record is in litigation InLitigation=1 then Litigation Publishing fees apply at T1

If the record is NOT in litigation InLitigation=0 then New Litigation fees apply at T1

NOTE: Any Timing beyond 48 months will occur in the 48th month.

All legal expense are adjusted using the VAT tax also located on the assumptions page.

EXAMPLE

ER=$1,066,835, T1=39, T2=51, ReSecured=0, InLitigation=1:

Results:

One cash payment at Time 48 of $1,066,835.

Expenses:

T1 Legal—Lookup in legal Not secured 1,050,000=5.75%; Expense=$61,343

Closing—1,050,000 * 3.6212%(sum of Pub Notary, Pub Registry, State Aq. Tax, Appraisal Fee)=$38,632
Plus Litigation Publishing cost of $1,438
Total T1 expenses=$101,413
T2 Legal—Lookup in legal Not secured 1,050,000=5.75%; Expense=$61,343
Closing—1,050,000*4.4338%(Brokerage fee)=$47,301
Total T2=$108,644

Deed In Lieu records refer to cases where deed to property is obtained in lieu of loan repayment and are contained in the "DeedinLieu" tab. This strategy involves two events "T1" and "T2". T1 can be either the event of obtaining ownership via foreclosure or obtaining ownership and selling the property in the same event. If T1 is a sales transaction then there would be no T2 event. T2 will occur when the obtaining ownership event and sales events are at different timings.

Cash Flows:
The first section contains the T1 OR T2 cash payment and represent the recovered amount associated with the sales transaction.

Timings:
Timings are obtained as part of the underwriting data from the database. They are adjusted during the "move data" function utilizing the "Delays by UPB bin" section on the assumptions page. Each record's event timings are adjusted based on the UPB bin that the record is associated with.
NOTE: Any Timing beyond 48 months will occur in the 48th month.

Expenses:
Expenses are calculated in the second section of the worksheet.
Legal expenses are incurred at the time of each event and are calculated as a percentage of the recovered amount. The percentage used is obtained from the "Legal fees based on % recovered UPB".
In addition to legal expenses, restate transaction expenses are incurred at each event. These expenses are obtained from the "Closing Costs Table LF and DIL (% of GDP)" section of the assumptions sheet. some of these expenses are incurred at both events, (Pub Notary, Pub Registry, State Aq. Tax, Appraisal Fee and Brokerage fees)
Other are dependent on the Resecured and InLitigation fields:
If the record is Real-estate secured ReSecured=1 then Certificate filing fees apply
If the record is in litigation InLitigation=1 then Litigation Publishing fees apply at T1
If the record is NOT in litigation InLitigation=0 then New Litigation fees apply at T1
NOTE: Any Timing beyond 48 months will occur in the 48th month.
All legal expense are adjusted using the VAT tax also located on the assumptions page.

EXAMPLE

ER=$1,050,000, T1=27, T2=51, ReSecured=0, InLitigation=1:
Results:
One cash payment at Time 48 of 1,050,000.
Expenses:
T1 Legal—Lookup in legal Not secured deedInLieu 1,050,000=5.75%; Expense=60,375
Closing—1,050,000*3.6212%(sum of Pub Notary, Pub Registry, State Aq. Tax, Appraisal Fee)=$38022
Plus Litigation Publishing cost of $1,438
Total T1 expenses=99,835
T2 Legal—Lookup in legal Not secured deedinLieu 1,050,000=5.75%; Expense=60,375
Closing—1,050,000*4.4338%(Brokerage fee)=$46555
Total T2=$106,930

What is claimed is:

1. A method for analyzing a deal that includes portfolios of distressed financial assets including loans or other financial instruments, using a network-based system including a server system coupled to a centralized database and at least one client system, said method comprising the steps of:
   generating a cash flow data table from various data sources, the data table including data relating to each asset included within the portfolios, the server system generates the cash flow data table;
   importing cash flow data from the data table into a cash flow model;
   automatically segmenting cash flow data by potential asset disposition types by using the server system to apply the cash flow model, each asset having a potential asset disposition type assigned thereto;
   determining a cash flow timing and an expense timing for each asset included within the portfolios based on the potential asset disposition type assigned thereto, the determination of the timings performed using the cash flow model and the server system;
   determining cash flow projections for the deal based on the determination of cash flow timings and expense timings for each asset included within the portfolios;
   performing sensitivity analysis using a Monte Carlo Simulation Model to provide different scenarios based on a variety of assumptions retrieved from the database including expected timing of recoveries, amount of recoveries, interest rates, and expenses, the server system uses the Simulation Model to generate a probabilistic distribution of a possible value of the deal including risk associated with uncertainty of future events; and
   exporting cash flow projections into a pre-determined format to develop financially attractive bids for the deal that takes into account a variety of foreseeable risks.

2. A method according to claim 1 wherein said step of importing cash flow data further comprises importing cash flow data utilizing an EXCEL VBA program.

3. A method according to claim 1 wherein the various data sources include at least one of information relating to a portfolio and its underlying assets, information from loan underwriters, knowledge captured from previous transactions, and inference data obtained from non-sampled assets.

4. A method according to claim 1 wherein the assumptions are retrieved from an assumptions worksheet included within the cash flow model.

5. A method according to claim 4 wherein the assumptions worksheet included within the cash flow model is stored on the client system.

6. A method according to claim 1 wherein the cash flow model allows user controlled queries to segment the portfolio containing a pool of assets.

7. A method according to claim 1 wherein the potential asset disposition types are at least one of a Discounted Pay Off (DPO) Disposition, an Inferred Disposition, a Loan Restructure Disposition, a Compliance Disposition, a Litigation with Foreclosure, a Litigation with Restructure Disposition, and a Deed In Lieu Disposition.

8. A method according to claim 1 wherein potential asset disposition types include mixed dispositions.

9. A method according to claim 1 wherein the cash flow model is configured to automatically segment cash flow data into mixed dispositions.

10. A method according to claim 1 wherein said step of performing sensitivity analysis comprises the steps of:
developing various assumptions relating to key parameters;
inputting the various assumptions; and
retrieving the various assumptions as required to perform sensitivity analysis.

11. A method according to claim 10 wherein said step of developing various assumptions comprises the step of inputting relevant valuation information to evaluate a portfolio of assets.

12. A method according to claim 10 wherein said step of developing various assumptions comprises the step of inputting assumptions related to at least one of Disposition Discount Rates, Value Added Tax Rates, Set Up Costs, Conversion and Loan Registration Costs, Asset Management expenses, Legal Fees based on Recovered Amount, Closing Costs related to Different Disposition Types, Various Different Rates and Factors, Economic Data, Sensitivity Assumptions and other Variables that are necessary in performing financial analysis.

13. A system for managing portfolio cash valuation for analyzing a deal that includes a portfolio of distressed financial assets including loans or other financial instruments, said system comprising:
at least one client system;
at least one server system coupled to a database for storing data; and
a network connecting said at least one client system to said server system, wherein said server system is programmed to:
generate a cash flow data table from various data sources, the data table including data relating to each asset included within the portfolios;
import cash flow data from the data table into a cash flow model;
automatically segment cash flow data by potential asset disposition types utilizing the cash flow model, each asset having a potential asset disposition type assigned thereto;
determine a cash flow timing and an expense timing for each asset included within the portfolio based on the potential asset disposition type assigned thereto, the determination of the timings performed using the cash flow model;
determine cash flow projections for the deal based on the determination of cash flow timings and expense timings for each asset included within the portfolio;
perform a sensitivity analysis using a Monte Carlo Simulation Model to provide different scenarios based on a variety of assumptions retrieved from the database including expected timing of recoveries, amount of recoveries, interest rates, and expenses, the Simulation Model generates a probabilistic distribution of a possible value of the deal including risk associated with uncertainty of future events; and
export cash flow projections into a pre-determined format to develop financially attractive bids for the deal that takes into account a variety of foreseeable risks.

14. A system according to claim 13 wherein said server system is further configured with consolidated analytical tools including at least one of a Cash Flow Model, a Monte Carlo Simulation Model and a Financial Analysis Model.

15. A system according to claim 14 wherein said Cash Flow Model is further configured with worksheets and code modules to perform the financial analysis.

16. A system according to claim 15 wherein said server system is further configured with at least one of data sheets, assumption sheets, cash flow sheets, and various disposition sheets.

17. A system according to claim 14 wherein said server system is further configured to perform sensitivity analysis on projected cash flows utilizing the Monte Carlo Simulation Model.

18. A system according to claim 13 wherein said server system is further configured with a suite of at least one of business processes, computer systems, analytical tools, data manipulation tools, business process tools, methodologies and analytics.

19. A system according to claim 13 wherein said server system is further configured with a database that accumulates and organizes data relating to at least one Bank Records, Credit Agencies, Government Agencies, Legal Documents and Contracts, and Underwriting Reports.

20. A system according to claim 19 wherein the accumulated data is utilized to generate the cash flow table.

21. A system according to claim 13 wherein said server system is further configured to:
download requested information from said server system; and
display requested information on said client system in response to the inquiry.

22. A system according to claim 13 wherein said server system is further configured to print requested information in a pre-determined format.

23. A system according to claim 13 wherein said client system is further configured with a displaying component.

24. A system according to claim 23 wherein said client system is further configured with a sending component to send an inquiry to said server system to process and download the requested information to said client system.

25. A system according to claim 24 wherein the sending component functions in response to a click of a mouse button.

26. A system according to claim 13 wherein said server system and client system are further configured to be protected from access by unauthorized individuals.

27. A computer program embodied on a computer readable medium for analyzing a deal that includes a portfolio of distressed financial assets including loans or other financial instruments, said computer program capable of being processed by a server system coupled to a centralized interactive database and at least one client system, said computer program comprising:
a code segment that receives information from various data sources;
a code segment that generates a cash flow data table from various data sources, the data table including data relating to each asset included within the portfolio;
a code segment that imports cash flow data from the data table into a cash flow model;
a code segment that automatically segments cash flow data by potential asset disposition types utilizing the cash flow model, each asset having a potential asset disposition type assigned thereto;
a code segment that determines a cash flow timing and an expense timing for each asset included within the portfolio based on the potential asset disposition type assigned thereto, the determination of the timings performed using the cash flow model;
a code segment that determines cash flow projections for the deal based on the determination of cash flow timings and expense timings for each asset included within the portfolio;

a code segment that performs sensitivity analysis using a Monte Carlo Simulation Model to provide different scenarios based on a variety of assumptions retrieved from the database including expected timing of recoveries, amount of recoveries, interest rates, and expenses, the Simulation Model generates a probabilistic distribution of a possible value of the deal including risk associated with uncertainty of future events; and a code segment that exports cash flow projections into a pre-determined format to develop financially attractive bids for the deal that takes into account a variety of foreseeable risks.

28. The computer program as recited in claim 27 wherein the information is received from the user via a graphical user interface.

29. The computer program as recited in claim 27 further includes a code segment that provides the information based on access levels.

30. The computer program as recited in claim 27 further includes a code segment that monitors interaction between various collaborators during due diligence.

31. The computer program as recited in claim 27 further comprising a code segment that accesses the centralized database.

32. The computer program as recited in claim 31 further comprising a code segment that searches the database regarding the specific inquiry.

33. The computer program as recited in claim 32 further comprising:
   a code segment that retrieves information from the database; and
   a code segment that causes the retrieved information to be displayed on the client system.

34. The computer program as recited in claim 27 wherein the client system and the server system are connected via one of a wide area network, a local area network, an intranet and the Internet.

35. The computer program as recited in claim 27, and further comprising a code segment that monitors the security of the system by restricting access to unauthorized individuals.

36. A computer for analyzing a deal that includes a portfolio of distressed financial assets including loans or other financial instruments, the computer coupled to a database, said computer programmed to:
   generate a cash flow data table from various data sources, the data table including data relating to each asset included within the portfolio;
   import cash flow data from the data table into a cash flow model;
   automatically segment cash flow data by potential asset disposition types utilizing the cash flow model, each asset having a potential asset disposition type assigned thereto;
   determine a cash flow timing and an expense timing for each asset included within the portfolios based on the potential asset disposition type assigned thereto, the determination of the timings performed using the cash flow model;
   determine cash flow projections for the deal based on the determination of cash flow timings and expense timings for each asset included within the portfolio;
   perform sensitivity analysis using a Monte Carlo Simulation Model to provide different scenarios based on a variety of assumptions retrieved from the database including expected timing of recoveries, amount of recoveries, interest rates, and expenses, the Simulation Model generates a probabilistic distribution of a possible value of the deal including risk associated with uncertainty of future events; and
   export cash flow projections into a pre-determined format to develop financially attractive bids for the deal that takes into account a variety of foreseeable risks.

* * * * *